US012776265B2

(12) United States Patent
Hu et al.

(10) Patent No.: US 12,776,265 B2
(45) Date of Patent: Oct. 27, 2026

(54) DISPLAY PANEL, DRIVING METHOD THEREOF, AND DISPLAY DEVICE

(71) Applicant: Tianma Advanced Display Technology Institute (Xiamen) Co., Ltd., Xiamen (CN)

(72) Inventors: Yuqi Hu, Xiamen (CN); Yingteng Zhai, Xiamen (CN); Jiaxian Liu, Xiamen (CN); Tianyi Wu, Xiamen (CN); Feng Qin, Xiamen (CN)

(73) Assignee: Tianma Advanced Display Technology Institute (Xiamen) Co., Ltd., Xiamen (CN)

( * ) Notice: Subject to any disclaimer, the term of this patent is extended or adjusted under 35 U.S.C. 154(b) by 161 days.

(21) Appl. No.: 18/599,481

(22) Filed: Mar. 8, 2024

(65) Prior Publication Data

US 2024/0249684 A1 Jul. 25, 2024

(30) Foreign Application Priority Data

Jan. 3, 2024 (CN) ......................... 202410009360.1

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2300/0861* (2013.01); *G09G 2310/08* (2013.01); *G09G 2320/064* (2013.01); *G09G 2340/0435* (2013.01)

(58) Field of Classification Search
CPC ... G09G 2300/0819; G09G 2300/0842; G09G 2300/0861; G09G 2310/08; G09G 2320/064; G09G 2340/0435; G09G 3/3233; G09G 3/32
See application file for complete search history.

(56) References Cited

U.S. PATENT DOCUMENTS

| | | | | |
|---|---|---|---|---|
| 11,100,849 | B1 * | 8/2021 | Yang | G09G 3/32 |
| 11,967,272 | B2 * | 4/2024 | Lin | G09G 3/32 |
| 12,322,311 | B2 * | 6/2025 | Park | G09G 3/2096 |
| 12,361,871 | B2 * | 7/2025 | Jung | G09G 3/2014 |
| 2020/0394953 | A1 * | 12/2020 | Kim | G09G 3/32 |
| 2021/0407384 | A1 * | 12/2021 | Yuan | G09G 3/32 |
| 2022/0101783 | A1 * | 3/2022 | Han | G09G 3/32 |

(Continued)

FOREIGN PATENT DOCUMENTS

CN 111429834 B * 8/2021 ........... G09G 3/3233

OTHER PUBLICATIONS

CN-111429834-B , Aug. 20, 2021, Jiang, Jian-xue (English Translation).*

*Primary Examiner* — Ricardo Osorio
(74) *Attorney, Agent, or Firm* — KDW FIRM PLLC

(57) ABSTRACT

A display panel includes a pixel circuit and a light-emitting element. The pixel circuit includes an amplitude modulation subcircuit and a pulse width modulation subcircuit, and the amplitude modulation subcircuit and the pulse width modulation subcircuit each includes a drive transistor. A working process of at least one of the amplitude modulation subcircuit or the pulse width modulation subcircuit includes a bias stage. A bias adjustment signal is provided to the drive transistor during the bias stage, and the bias adjustment signal is configured to adjust the bias state of the drive transistor.

20 Claims, 11 Drawing Sheets

(56) References Cited

U.S. PATENT DOCUMENTS

| | | | | |
|---|---|---|---|---|
| 2022/0224951 | A1* | 7/2022 | Iguchi | H04H 60/40 |
| 2022/0246088 | A1* | 8/2022 | Zhai | G09G 3/32 |
| 2022/0335872 | A1* | 10/2022 | Zhang | G09G 3/3233 |

* cited by examiner

DISPLAY PANEL, DRIVING METHOD THEREOF, AND DISPLAY DEVICE

CROSS-REFERENCE TO RELATED APPLICATION(S)

This disclosure claims priority to Chinese Patent Application No. 202410009360.1 filed with the China National Intellectual Property Administration (CNIPA) on Jan. 3, 2024, the disclosure of which is incorporated herein by reference in its entirety.

TECHNICAL FIELD

The present disclosure relates to the field of display technologies, for example, a display panel, a driving method of a display panel, and a display device.

BACKGROUND

With the development of display technology, the application of a display panel is increasingly widespread, and there are also increasing demands on the display quality of display panels from users. In order to satisfy the requirement for higher definition, the resolution of the display panel is getting higher and higher.

In order to satisfy the driving requirement of a display panel with high resolution, such as a micro light-emitting diode (Micro LED) display panel or an organic light-emitting diode (OLED) display panel, a pixel circuit adopting a combination of pulse amplitude modulation (PAM) and pulse width modulation (PWM) is used to control the intensity of a drive current and the duration of the drive current, so as to control the light-emitting state of a light-emitting element.

For the pixel circuit adopting a combination of pulse amplitude modulation (PAM) and pulse width modulation (PWM), how to optimize the performance of the pixel circuit is an important issue faced by those skilled in the art.

SUMMARY

The present disclosure provides a display panel, a driving method of a display panel, and a display device.

The present disclosure provides a display panel. The display panel includes a pixel circuit and a light-emitting element. The pixel circuit includes an amplitude modulation subcircuit and a pulse width modulation subcircuit, and the amplitude modulation subcircuit and the pulse width modulation subcircuit each includes a drive transistor. A working process of at least one of the amplitude modulation subcircuit or the pulse width modulation subcircuit includes a bias stage, a bias adjustment signal is provided to the drive transistor during the bias stage, and the bias adjustment signal is configured to adjust a bias state of the drive transistor.

The present disclosure provides a display device including the display panel.

The present disclosure provides a driving method of a display panel. The display panel includes a pixel circuit and a light-emitting element. The pixel circuit includes an amplitude modulation subcircuit and a pulse width modulation subcircuit, and the amplitude modulation subcircuit and the pulse width modulation subcircuit each includes a drive transistor. A working process of at least one of the amplitude modulation subcircuit or the pulse width modulation subcircuit includes a bias stage. The driving method includes that: the drive transistor is provided with a bias adjustment signal during the bias stage, where the bias adjustment signal is configured to adjust a bias state of the drive transistor.

REFERENCE LIST

Figure 1:
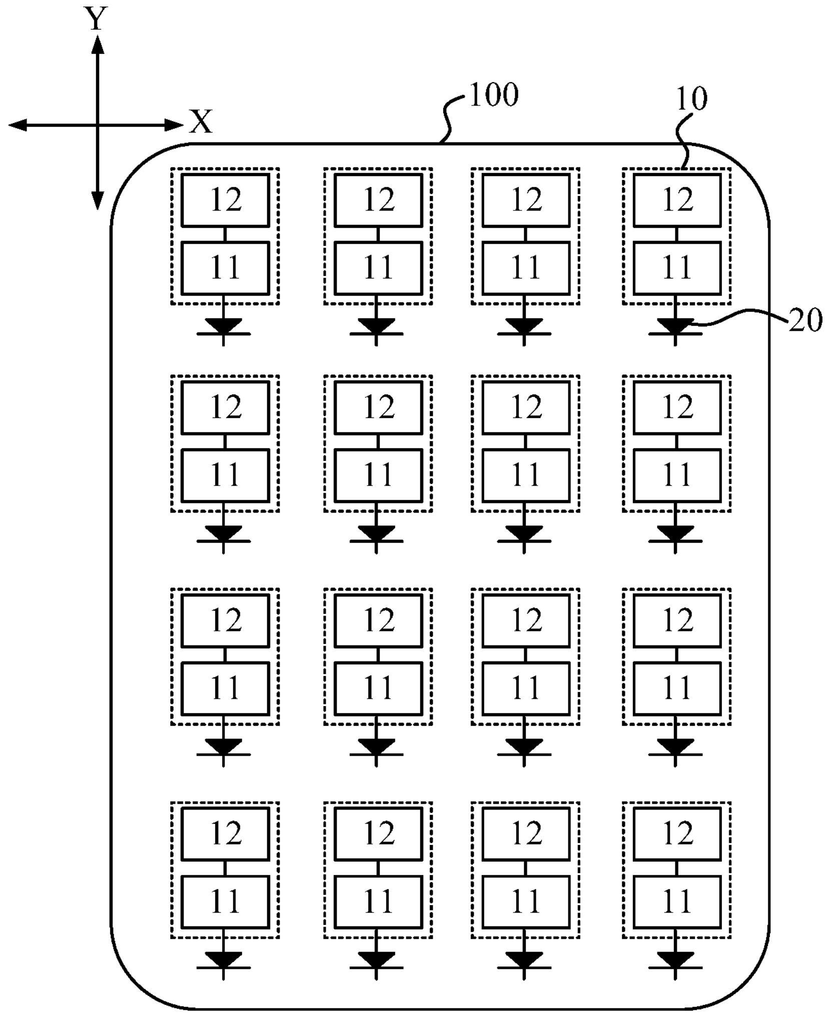
FIG. 1 shows a schematic structural diagram of a display panel according to an embodiment of the present disclosure.

100 display panel
10 pixel circuit
101 first pixel circuit
102 second pixel circuit
20 light-emitting element

21 first light-emitting element
22 second light-emitting element
11 amplitude modulation subcircuit
1121 first data write module
1122 first bias module
113 first reset module
T11 first drive transistor
T121 first data write transistor
T122 first bias transistor
T13 first reset transistor
PAM_DATA first data signal
PAM_DVH first bias adjustment signal
PAM_REF1 first reset signal
12 pulse width modulation subcircuit
1221 second data write module
1222 second bias module
123 second reset module
T21 second drive transistor
T221 second data write transistor
T222 second bias transistor
T23 second reset transistor
PWM_DATA second data signal
PWM_DVH second bias adjustment signal
PWM_REF1 second reset signal
1000 display device

DETAILED DESCRIPTION

Features and exemplary embodiments of various aspects of the present disclosure will be described in detail below. To make purposes, technical solutions, and advantages of the present disclosure clearer, the present disclosure will be described in detail below in conjunction with the accompanying drawings and embodiments. It should be understood that a specific embodiment described herein is only intended to interpret the present disclosure, and is not intended to limit the present disclosure. For those skilled in the art, the present disclosure may be implemented without requiring some details in the specific details. The following descriptions of the embodiments are merely intended to provide a better understanding of the present disclosure by using an example shown in the present disclosure.

It should be noted that in this specification, relational terms such as the first and the second are merely intended to distinguish one entity or operation from another entity or operation, and do not necessarily require or imply that any such actual relationship or sequence exists between these entities or operations. Moreover, the term "include", "contain" or any other variant thereof is intended to express non-exclusive inclusion so that a process, a method, an article or an apparatus including a series of elements includes not only those elements but also other elements not explicitly listed, or also includes elements inherent in such a process, method, article or apparatus. In the absence of other restrictions, an element defined by the phrase "including . . . " does not exclude the presence of additional identical elements in the process, method, article, or apparatus that includes the element.

It should be understood that, when describing the structure of a component, when one layer or region is referred to as being located "on" or "above" another layer or region, this may mean that it is directly located "on" or "above" another layer or region or that there are other layers or regions between one layer or region and another layer or region. In addition, if the component is reversed, one layer or region will be "beneath" or "below" another layer or region.

It should be understood that the term "and/or" as used herein is merely an association relationship that describes associated objects, and indicates that three relationships may exist. For example, A and/or B may represent three cases, i.e., A exists alone, A and B exist simultaneously, and B exists alone. In addition, the character "/" herein generally indicates that the former and latter associated objects are in an "or" relationship.

In the embodiments of the present disclosure, the term "electrically connected" may refer to that two assemblies are directly electrically connected, and may also refer to that two assemblies are electrically connected via one or more other assemblies.

The term "connected" may mean "electrically connected" or "not electrically connected by an intermediate transistor". The term "insulated" may mean "electrically insulated" or "electrically isolated". The term "drive" may mean "control" or "operate". The term "part" may mean "local". The term "pattern" may mean "member". The term "end" may refer to "end segment" or "end edge". The display panel may be a display device or a module/portion of a display device.

It will be apparent to those skilled in the art that various modifications and variations may be made in the present disclosure without departing from the spirit or scope of the present disclosure. Accordingly, it is intended that the present disclosure covers modifications and variations of the present disclosure that come within the scope of the corresponding claims (the claimed technical solution) and their equivalents. It should be noted that the implementations provided in the embodiments of the present disclosure may be combined with each other without contradiction.

An embodiment of the present disclosure provides a display panel, a driving method of a display panel, and a display device. Various embodiments of the display panel, the driving method of the display panel, and the display device will be described in conjunction with the accompanying drawings below.

As shown in FIG. 1, the display panel 100 includes a pixel circuit 10 and a light-emitting element 20.

The pixel circuit 10 is connected to the light-emitting element 20, and the pixel circuit 10 is configured to drive the light-emitting element 20 to emit the light.

The light-emitting element 20 may be a light-emitting element such as a micro LED or an OLED. In an implementation, the light-emitting element 20 may be designed according to a practical situation. For example, the light-emitting element 20 may be an inorganic light-emitting element that includes a first electrode, a second electrode, and an inorganic semiconductor disposed between the first electrode and the second electrode.

The pixel circuit 10 includes an amplitude modulation subcircuit 11 and a pulse width modulation subcircuit 12. The amplitude modulation subcircuit 11 is connected to the pulse width modulation subcircuit 12.

The pixel circuit 10 generates a drive current under the control of the amplitude modulation subcircuit 11 and the pulse width modulation subcircuit 12. The amplitude modulation subcircuit 11 may be configured to control the amplitude of the drive current, and the pulse width modulation subcircuit 12 may be configured to adjust the pulse width of the voltage applied to the first electrode of the light-emitting element 20.

In FIG. 1, X denotes the first direction, Y denotes the second direction, and direction X is perpendicular to direction Y.

To adjust the gray scale or brightness displayed by the light-emitting element, the pulse width modulation subcircuit 12 adjusts the pulse width of the voltage applied to the first electrode of the light-emitting element 20, that is, the pulse width modulation subcircuit 12 adjusts the actual emission time period of the drive current applied to the light-emitting element 20, and at the same time the drive current applied to the light-emitting element is maintained at a constant level, instead of being adjusted in magnitude. Therefore, the amplitude modulation subcircuit 11 may provide the drive current to the light-emitting element so that the light-emitting element is driven at optimal light-emitting efficiency, and the pulse width modulation subcircuit 12 adjusts the light-emitting duty ratio of the light-emitting element (i.e., the emission time period of the light-emitting element) so as to adjust the gray scale or brightness displayed by the light-emitting element.

Both the amplitude modulation subcircuit 11 and the pulse width modulation subcircuit 12 may include a drive transistor. The working process of at least one of the amplitude modulation subcircuit 11 or the pulse width modulation subcircuit 12 includes a bias stage. A bias adjustment signal is provided to the drive transistor during the bias stage, and the bias adjustment signal is configured to adjust the bias state of the drive transistor.

In an example, the amplitude modulation subcircuit 11 includes at least one bias stage, and the pulse width modulation subcircuit 12 does not include a bias stage. During the bias stage of the amplitude modulation subcircuit 11, a bias adjustment signal is provided to a drive transistor of the amplitude modulation subcircuit 11, and is configured to adjust the bias state of the drive transistor of the amplitude modulation subcircuit 11.

In another example, the pulse width modulation subcircuit 12 includes at least one bias stage, and the amplitude modulation subcircuit 11 does not include the bias stage. During the bias stage of the pulse width modulation subcircuit 12, a bias adjustment signal is provided to a drive transistor of the pulse width modulation subcircuit 12, and is configured to adjust the bias state of the drive transistor of the pulse width modulation subcircuit 12.

In still another example, the amplitude modulation subcircuit 11 includes at least one bias stage, and the pulse width modulation subcircuit 12 includes at least one bias stage. During the bias stage of the amplitude modulation subcircuit 11, a bias adjustment signal is provided to a drive transistor of the amplitude modulation subcircuit 11, and is configured to adjust the bias state of the drive transistor of the amplitude modulation subcircuit 11. During the bias stage of the pulse width modulation subcircuit 12, a bias adjustment signal is provided to a drive transistor of the pulse width modulation subcircuit 12, and is configured to adjust the bias state of the drive transistor of the pulse width modulation subcircuit 12.

A threshold voltage of the drive transistor may vary according to a manner of variation of a gate-to-source voltage (Vgs) of the drive transistor. For example, the threshold voltage of the drive transistor may present a first average voltage when Vgs rises from low to high, but may present a second average level different from the first average voltage when Vgs drops from high to low, whereby different current-voltage (I-V) curves are generated. This dependence of the threshold voltage on the actual value of Vgs is referred to as "hysteresis" of the transistor or an offset of threshold voltage of the transistor.

In some cases, the threshold voltage Vth may be offset, for example, when the display panel 100 is converted from a black picture to a white picture or the display panel 100 is converted from one grayscale to another grayscale, the offset of the threshold voltage Vth (i.e., the "hysteresis" of the foregoing transistor) may result in a decrease in the brightness of the display panel. For example, the saturation current Ids waveform of the Vgs function of the drive transistor as the black frame is slightly deviated from the target Ids waveform of the Vgs function of the drive transistor as the white frame. In a case where the adjustment of the bias state is not performed, the sampled Vth will correspond to a deviation from the target Ids curve.

However, in the embodiments of the present disclosure, for the pixel circuit including the amplitude modulation subcircuit 11 and/or the pulse width modulation subcircuit 12, the bias stage is introduced so that the bias adjustment signal may be input to the source or drain of the drive transistor in the amplitude modulation subcircuit 11 and/or the pulse width modulation subcircuit, thereby reducing the offset of the threshold voltage of the transistor, effectively improving the "hysteresis" phenomenon of the transistor, and facilitating the optimization of the performance of the pixel circuit.

Figure 2:
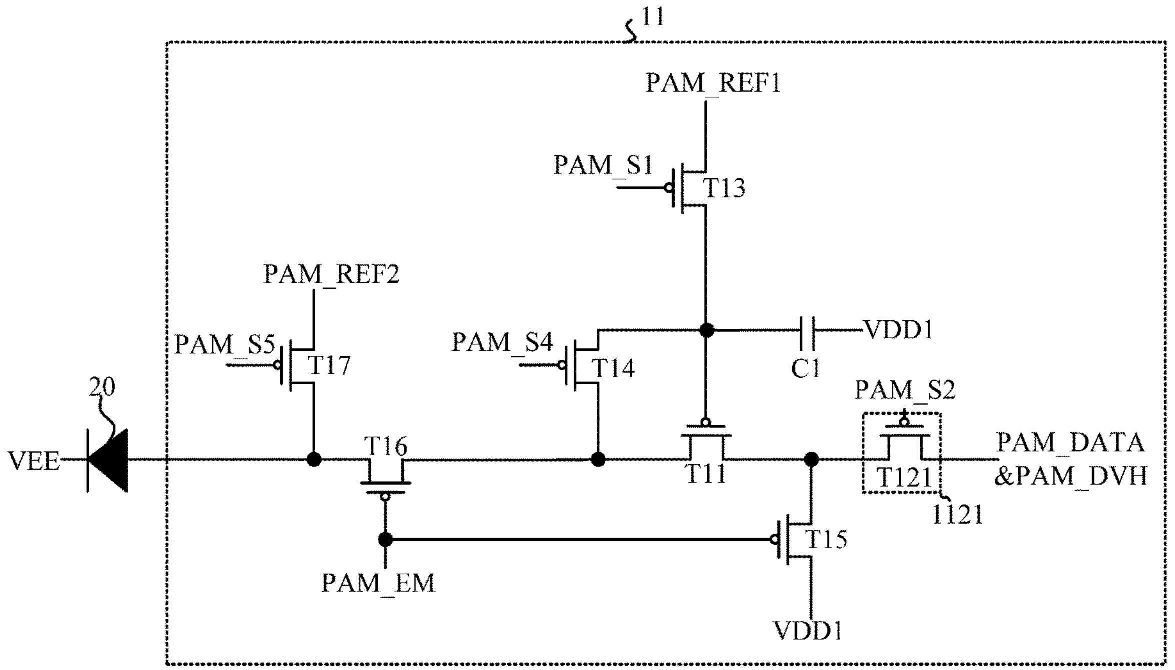
FIG. 2 shows a schematic structural diagram of an amplitude modulation subcircuit in a display panel according to an embodiment of the present disclosure.
Figure 3:
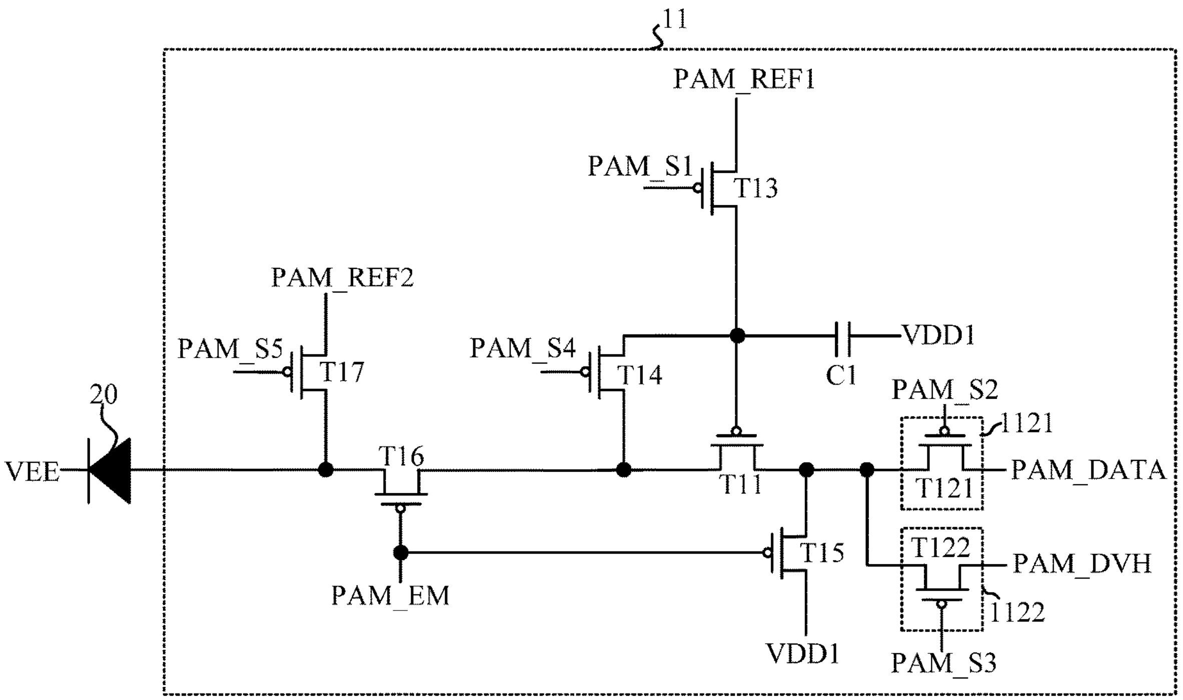
FIG. 3 shows another schematic structural diagram of an amplitude modulation subcircuit in a display panel according to an embodiment of the present disclosure.
Figure 4:
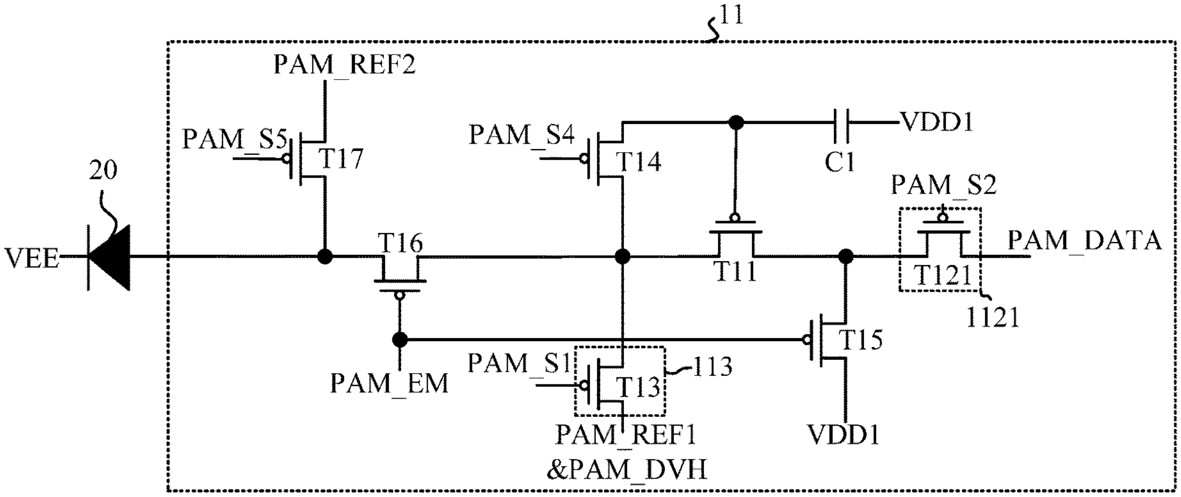
FIG. 4 shows still another schematic structural diagram of an amplitude modulation subcircuit in a display panel according to an embodiment of the present disclosure.
Figure 5:
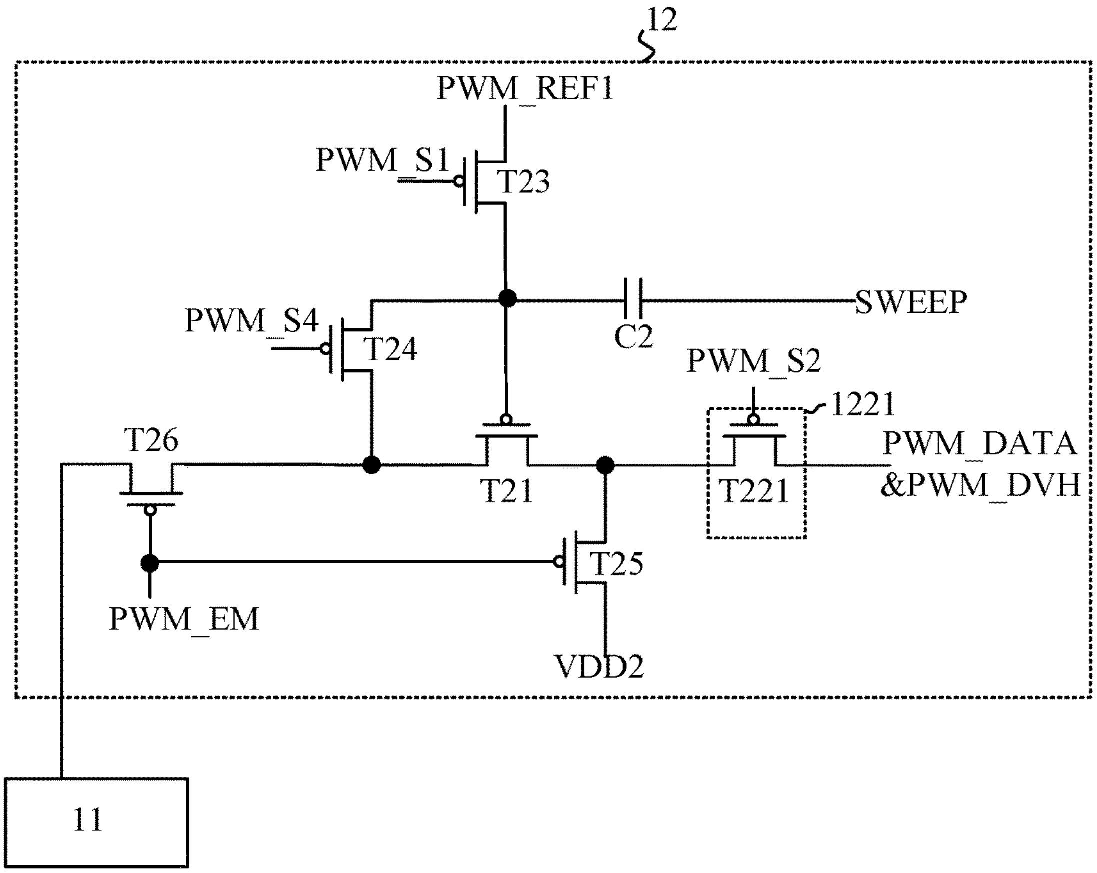
FIG. 5 shows a schematic structural diagram of a pulse width modulation subcircuit in a display panel according to an embodiment of the present disclosure.
Figure 6:
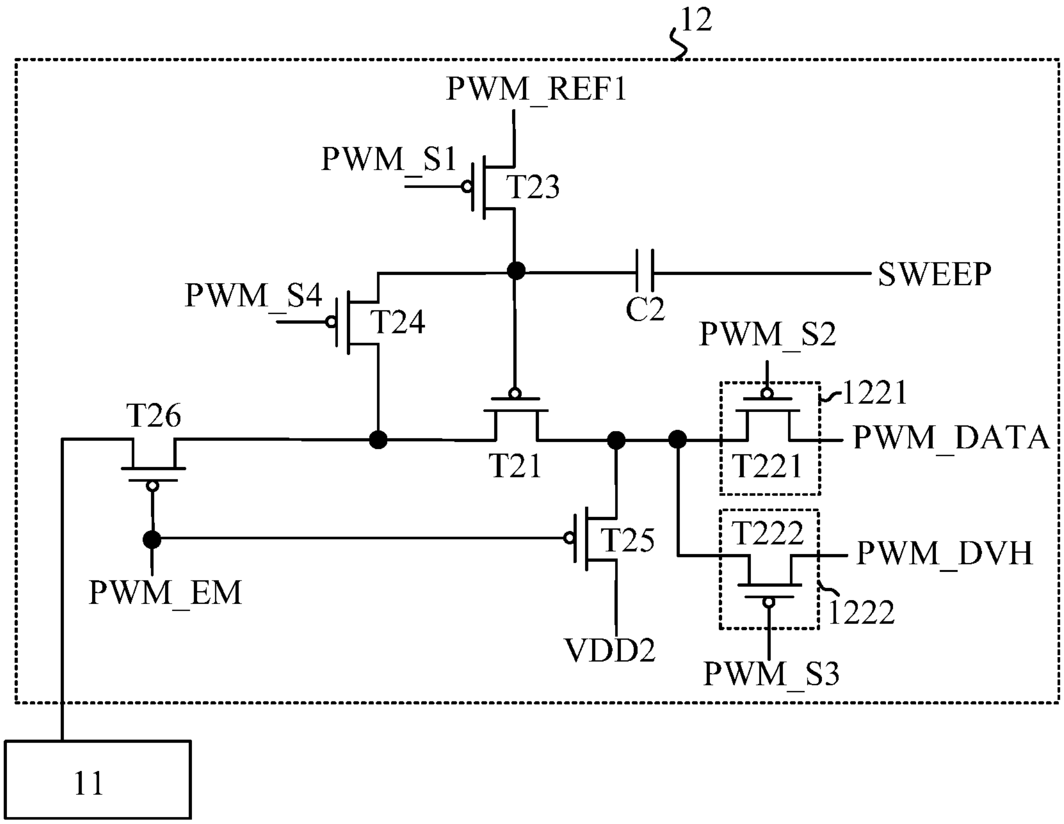
FIG. 6 shows another schematic structural diagram of a pulse width modulation subcircuit in a display panel according to an embodiment of the present disclosure.
Figure 7:
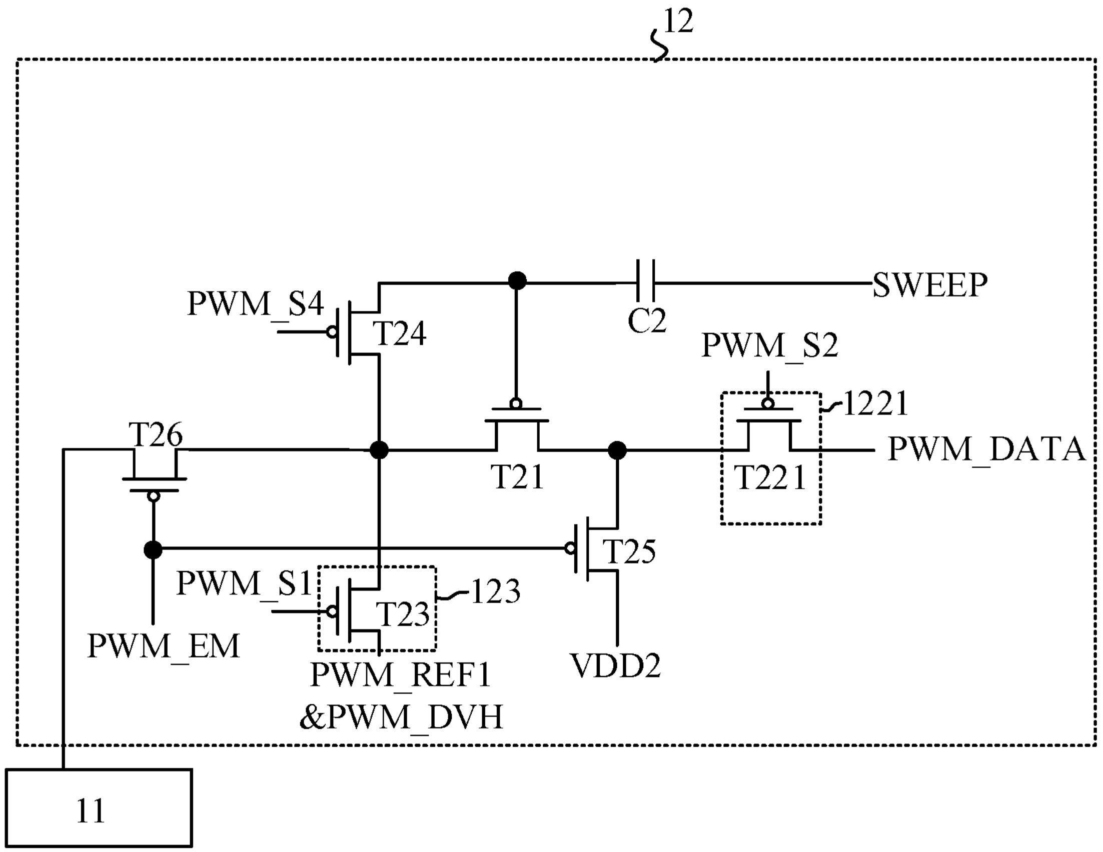
FIG. 7 shows still another schematic structural diagram of a pulse width modulation subcircuit in a display panel according to an embodiment of the present disclosure.

Some structures of the amplitude modulation subcircuit 11 and the pulse width modulation subcircuit 12 will be described exemplarily below. FIG. 2 to FIG. 4 show some exemplary structures of the amplitude modulation subcircuit 11, and FIG. 5 to FIG. 7 show some exemplary structures of the pulse width modulation subcircuit 12. It should be noted that the amplitude modulation subcircuit 11 mayinclude, but is not limited to, the structures shown in FIG. 2 to FIG. 4, and the pulse width modulation subcircuit 12 may include, but is not limited to, the structures shown in FIG. 5 to FIG. 7.

For ease of description, in the following example, the drive transistor of the amplitude modulation subcircuit 11 is referred to as a first drive transistor, and a bias adjustment signal provided to the first drive transistor is referred to as a first bias adjustment signal. A drive transistor of the pulse width modulation subcircuit 12 is referred to as a second drive transistor, and a bias adjustment signal provided to the second drive transistor is referred to as a second bias adjustment signal.

Some exemplary structures of the amplitude modulation subcircuit 11 are firstly described.

In some embodiments, the working process of the amplitude modulation subcircuit 11 includes a first data write stage and a first bias stage.

As an example, as shown in FIG. 2, the amplitude modulation subcircuit 11 includes a first data write module 1121. The first data write module 1121 is configured to write a first data signal PAM_DATA during the first data write stage, and is configured to write a first bias adjustment signal PAM_DVH during the first bias stage.

Exemplarily, the first data write module 1121 includes a first data write transistor T121, and the first data write transistor T121 may provide the first data signal PAM_DATA and the first bias adjustment signal PAM_DVH for a first drive transistor T11. In this example, the first data write transistor T121 may be reused.

Exemplarily, in FIG. 2, a scan signal PAM_S2 and a scan signal PAM_S4 are different signals, and the scan signal PAM_S2 and a scan signal PAM_S5 may be the same signal.

In FIG. 2, VEE denotes the negative supply voltage.

In another example, as shown in FIG. 3, the amplitude modulation subcircuit 11 includes a first data write module 1121 and a first bias module 1122. The first data write module 1121 is configured to write the first data signal PAM_DATA during the first data write stage, and the first bias module 1122 is configured to write the first bias adjustment signal PAM_DVH during the first bias stage.

Exemplarily, the first data write module 1121 includes a first data write transistor T121, the first bias module 1122 includes a first bias transistor T122, the first data write transistor T121 may provide the first data signal PAM-_DATA for the first drive transistor T11, and the first bias transistor T122 may provide the first bias adjustment signal PAM_DVH for the first drive transistor T11. In this example, the first data signal PAM_DATA and the first bias adjustment signal PAM_DVH are separately transmitted by using different transistors.

Exemplarily, in FIG. 3, the scan signal PAM_S4 and the scan signal PAM_S2 or the scan signal PAM_S5 may be the same signal, and the scan signal PAM_S3 and the scan signal PAM_S5 may be the same signal.

In still another example, the working process of the amplitude modulation subcircuit 11 mayfurther include a first reset stage, and during the first reset stage, a first reset signal is provided to a gate of the drive transistor of the amplitude modulation subcircuit 11. As shown in FIG. 4, the amplitude modulation subcircuit 11 includes a first reset module 113, where the first reset module 113 is configured to write a first reset signal PAM_REF1 during the first reset stage, and is configured to write the first bias adjustment signal PAM_DVH during the first bias stage.

Exemplarily, the first reset module 113 includes a first reset transistor T13, and the first reset transistor T13 may provide the first reset signal PAM_REF1 and the first bias adjustment signal PAM_DVH for the first drive transistor T11. In this example, the first reset transistor T13 may be reused.

Exemplarily, in FIG. 4, the scan signal PAM_S2 and the scan signal PAM_S4 are different signals, and a scan signal PAM_S1 and the scan signal PAM_S5 may be the same signal.

In some embodiments, as shown in FIG. 2 to FIG. 4, the amplitude modulation subcircuit 11 may further include a first compensation transistor T14, a first power write transistor T15, a first light-emitting control transistor T16, a first initialization transistor T17, and a first capacitor C1.

A first electrode of the first compensation transistor T14 is connected to a second electrode of the first drive transistor T11, a second electrode of the first compensation transistor T14 is connected to a gate of the first drive transistor T11, and a gate of the first compensation transistor T14 is connected to the scan signal PAM_S4.

A first electrode of the first power write transistor T15 is connected to a first power line VDD1, a second electrode of the first power write transistor T15 is connected to a first electrode of the first drive transistor T11, a first electrode of the first light-emitting control transistor T16 is connected to a second electrode of the first drive transistor T11, a second electrode of the first light-emitting control transistor T16 is connected to a first electrode of the light-emitting element 20, and a gate of the first power write transistor T15 and a gate of the first light-emitting control transistor T16 receive a light-emitting control signal PAM_EM. As shown in FIG. 2 to FIG. 4, the gate of the first power write transistor T15 and the gate of the first light-emitting control transistor T16 receive the same light-emitting control signal PAM_EM. In some embodiments, the gate of the first power write transistor T15 and the gate of the first light-emitting control transistor T16 receive different light-emitting control signals.

A first electrode of the first initialization transistor T17 receives a first initialization signal PAM_REF2, a second electrode of the first initialization transistor T17 is connected to the first electrode of the light-emitting element 20, and a gate of the first initialization transistor T17 is connected to the scan signal PAM_S5.

A first electrode of the first capacitor C1 is connected to the first power line VDD1, and a second electrode of the first capacitor C1 is connected to the gate of the first drive transistor T11.

Any one of the first electrode and the second electrode of each transistor in the amplitude modulation subcircuit 11 is a source, and the other of the first electrode and the second electrode of each transistor in the amplitude modulation subcircuit 11 may be a drain. In the foregoing example, each active layer of the first drive transistor T11, the first data write transistor T121, the first bias transistor T122, the first reset transistor T13, the first compensation transistor T14, the first power write transistor T15, the first light-emitting control transistor T16, and the first initializing transistor T17 may be formed of any one of polysilicon, amorphous silicon, and an oxide semiconductor. When the active layer in the transistor is formed of polysilicon, the active layer may be formed by a low temperature polysilicon (LTPS) process.

Exemplarily, the active layer of the first reset transistor T13 and the first compensation transistor T14 in the amplitude modulation subcircuit 11 mayinclude an oxide semiconductor, and the active layer of the remaining transistors includes polysilicon.

Transistors whose active layers are oxide semiconductors present relatively lower leakage currents than silicon transistors. The active layers of part of transistors are set to be oxide semiconductors, so that the flickering of the display panel can be effectively reduced. In some embodiments, the first drive transistor T11, the first data write transistor T121, the first reset transistor T13, the first compensation transistor T14, the first power write transistor T15, the first light-emitting control transistor T16, and the first initialization transistor T17 in the amplitude modulation subcircuit 11 may be a P-type transistor or an N-type transistor.

Exemplarily, the first reset transistor T13 and the first compensation transistor T14 in the amplitude modulation subcircuit 11 may be an N-type transistor, and the remaining transistors may be a P-type transistor.

Exemplarily, the first drive transistor T11 in the amplitude modulation subcircuit 11 is a P-type transistor.

In some embodiments, the first drive transistor T11 in the amplitude modulation subcircuit 11 is an N-type transistor.

Some examples of the pulse width modulation subcircuit 12 are described below.

In some embodiments, the working process of the pulse width modulation subcircuit 12 includes a second data write stage and a second bias stage.

As an example, as shown in FIG. 5, the pulse width modulation subcircuit 12 includes a second data write module 1221, where the second data write module 1221 is configured to write a second data signal PWM_DATA during the second data write stage, and is configured to write a second bias adjustment signal PWM_DVH during the second bias stage.

Exemplarily, the second data write module 1221 mayinclude a second data write transistor T221, and the second data write transistor T221 may provide the second data signal PWM_DATA and the second bias adjustment signal PWM_DVH for the second drive transistor T21. In this example, the second data write transistor T221 may be reused.

Exemplarily, in FIG. 5, a scan signal PWM_S2 and a scan signal PWM_S4 are different signals.

In another example, as shown in FIG. 6, the pulse width modulation subcircuit 12 includes a second data write module 1221 and a second bias module 1222. The second data write module 1221 is configured to write the second data signal PWM_DATA during the second data write stage, and the second bias module 1222 is configured to write the second bias adjustment signal PWM_DVH during the second bias stage.

Exemplarily, the second data write module 1221 includes a second data write transistor T221, the second bias module 1222 includes a second bias transistor T222, the second data write transistor T221 may provide the second data signal PWM_DATA for the second drive transistor T21, and the second bias transistor T222 may provide the second bias adjustment signal PWM_DVH for the second drive transistor T21. In this example, the second data signal PWM_DATA and the second bias adjustment signal PWM_DVH are separately transmitted by using different transistors.

Exemplarily, in FIG. 6, the scan signal PWM_S4 and the scan signal PWM_S2 or a scan signal PWM_S5 may be the same signal.

PWM_S1 and PWM_S3 denote scan signals.

In still another example, the working process of the pulse width modulation subcircuit 12 may further include a second reset stage. As shown in FIG. 7, the pulse width modulation subcircuit 12 includes a second reset module 123, where the second reset module 123 is configured to write a second reset signal PWM_REF1 during the second reset stage, and is configured to write the second bias adjustment signal PWM_DVH during the second bias stage.

Exemplarily, the second reset module 123 includes a second reset transistor T23, and the second reset transistor T23 may provide the second reset signal PWM_REF1 and the second bias adjustment signal PWM_DVH for the second drive transistor T21. In this example, the second reset transistor T23 may be reused.

Exemplarily, in FIG. 7, the scan signal PWM_S2 and the scan signal PWM_S4 may be the same signal.

In some embodiments, as shown in FIG. 5 to FIG. 7, the pulse width modulation subcircuit 12 mayfurther include a second compensation transistor T24, a second power write transistor T25, a second light-emitting control transistor T26, and a second capacitor C2.

A first electrode of the second compensation transistor T24 is connected to a second electrode of the second drive transistor T21, a second electrode of the second compensation transistor T24 is connected to a gate of the second drive transistor T21, and a gate of the second compensation transistor T24 is connected to the scan signal PWM_S4.

A first electrode of the second power supply write transistor T25 is connected to a second power line VDD2, a second electrode of the second power supply write transistor T25 is connected to a first electrode of the second drive transistor T21, a first electrode of the second light-emitting control transistor T26 is connected to a second electrode of the second drive transistor T21, a second electrode of the second light-emitting control transistor T26 is connected to the amplitude modulation subcircuit 11, and a gate of the second power supply write transistor T25 and a gate of the second light-emitting control transistor T26 receive a light-emitting control signal PWM_EM. As shown in FIG. 5 to FIG. 7, the gate of the second power supply write transistor T25 and the gate of the second light-emitting control transistor T26 receive the same light-emitting control signal PWM_EM. In some embodiments, the gate of the second power write transistor T25 and the gate of the second light-emitting control transistor T26 receive different light-emitting control signals.

In some embodiments, the first power write transistor T15 and the first light-emitting control transistor T16 in the amplitude modulation subcircuit 11, and the second power write transistor T25 and the second light-emitting control transistor T26 in the pulse width modulation subcircuit 12 may receive the same light-emitting control signal or different light-emitting control signals.

A first electrode of the second capacitor C2 receives a sweep signal SWEEP, and a second electrode of the second capacitor C2 is connected to the gate of the second drive transistor T21.

One of the first electrode and the second electrode of each transistor in the pulse width modulation subcircuit 12 is a source, and the other of the first electrode and the second electrode of each transistor in the pulse width modulation subcircuit 12 may be a drain. In the above-described example, each active layer in the second drive transistor T21, the second data write transistor T221, the second bias transistor T222, the second reset transistor T23, the second compensation transistor T24, the second power write transistor T25 and the second light-emitting control transistor T26 may be formed of any one of polysilicon, amorphous silicon, and an oxide semiconductor. When the active layer in the transistor is formed of polysilicon, the active layer may be formed by a low temperature polysilicon (LTPS) process.

Exemplarily, the active layer of the second reset transistor T23 and the second compensation transistor T24 in the pulse width modulation subcircuit 12 may include an oxide semiconductor, and the active layer of the remaining transistors includes polysilicon. Transistors whose active layers are oxide semiconductors present relatively lower leakage currents than silicon transistors. The active layers of part of transistors are set to be oxide semiconductors, so that the flickering of the display panel can be effectively reduced.

In some embodiments, the second drive transistor T21, the second data write transistor T221, the second reset transistor T23, the second compensation transistor T24, the second power write transistor T25 and the second light-emitting control transistor T26 in the pulse width modulation subcircuit 12 may be a P-type transistor or an N-type transistor.

Exemplarily, the second reset transistor T23 and the second compensation transistor T24 in the pulse width modulation subcircuit 12 may be an N-type transistor, and the remaining transistors may be a P-type transistor.

Exemplarily, the second drive transistor T21 in the pulse width modulation subcircuit 12 is a P-type transistor.

In some embodiments, the second drive transistor T21 in the pulse width modulation subcircuit 12 is an N-type transistor.

Exemplarily, the amplitude modulation subcircuit 11 maycontrol the amplitude of the drive current based on the voltage value of the first data signal PAM_DATA. The pulse width modulation subcircuit 12 maygenerate a control current based on the voltage value of the second data signal PWM_DATA and the potential change rate of the sweep signal SWEEP, and control the voltage of a node at which the pulse width modulation subcircuit 12 is connected to the amplitude modulation subcircuit 11. The control current of the pulse width modulation subcircuit 12 may control the pulse width of the voltage applied to the first electrode of the light-emitting element, and the pulse width modulation subcircuit 12 may perform the pulse width control or the pulse width adjustment on the voltage applied to the first electrode of the light-emitting element.

It should be noted that the pulse width modulation subcircuit 12 further includes a sweep signal SWEEP, where the sweep signal SWEEP may be a ramp signal. The voltage applied to the node at which the pulse width modulation subcircuit 12 is connected to the amplitude modulation subcircuit 11 may be jointly controlled by the sweep signal SWEEP and the second data signal PWM_DATA.

Figure 8:
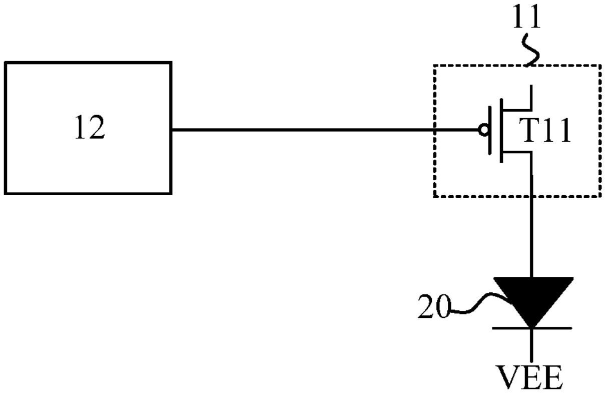
FIG. 8 shows a schematic diagram of a connection between an amplitude modulation subcircuit and a pulse width modulation subcircuit in a display panel according to an embodiment of the present disclosure.
Figure 9:
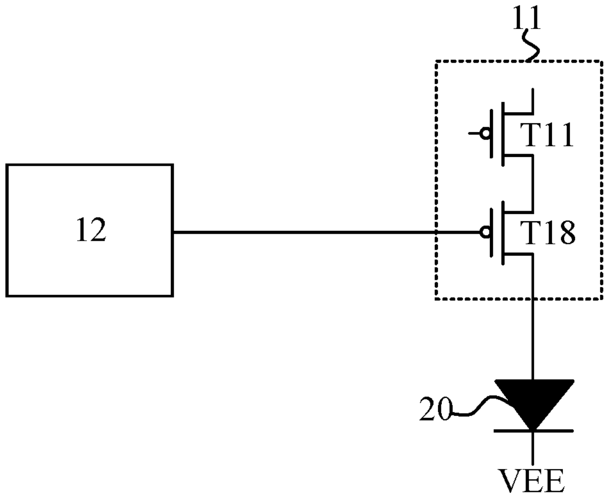
FIG. 9 shows a schematic diagram of another connection between an amplitude modulation subcircuit and a pulse width modulation subcircuit in a display panel according to an embodiment of the present disclosure.
Figure 10:
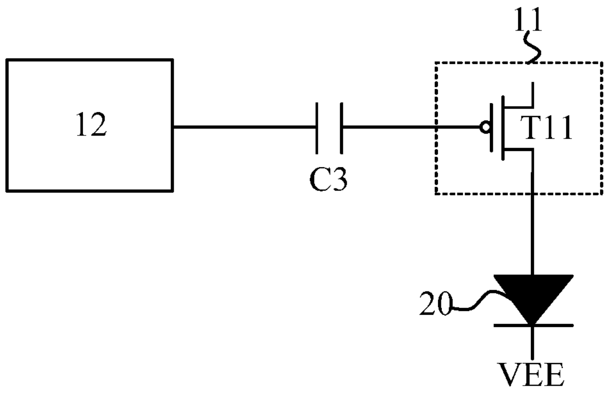
FIG. 10 shows a schematic diagram of still another connection between an amplitude modulation subcircuit and a pulse width modulation subcircuit in a display panel according to an embodiment of the present disclosure.

Referring to FIG. 8 to FIG. 10, some connection manners between the amplitude modulation subcircuit 11 and the pulse width modulation subcircuit 12 are described exemplarily.

As shown in FIG. 8, the pulse width modulation subcircuit 12 may be connected to the gate of the first drive transistor T11 in the amplitude modulation subcircuit 11.

Alternatively, as shown in FIG. 9, the amplitude modulation subcircuit 11 may further include a first control transistor T18, and the first control transistor T18 is connected between the first drive transistor T11 and the light-emitting element 20. The pulse width modulation subcircuit 12 may be connected to a gate of the first control transistor T18.

Alternatively, as shown in FIG. 10, the pixel circuit may further include a connection capacitor C3, and the pulse width modulation subcircuit 12 may be connected to the gate of the first drive transistor T11 in the amplitude modulation subcircuit 11 by using the connection capacitor C3.

In some embodiments, the pixel circuit may further include a connection capacitor and a first control transistor, the first control transistor is connected between the first drive transistor and the light-emitting element, and the pulse width modulation subcircuit 12 may be connected to the first control transistor through the connection capacitor.

It should be noted that the structure of any amplitude modulation subcircuit 11 in FIG. 2 to FIG. 4 and the structure of any pulse width modulation subcircuit 12 in FIG. 5 to FIG. 7 may be combined. In addition, the amplitude modulation subcircuit 11 and the pulse width modulation subcircuit 12 may be connected in any one connection manner in FIG. 8 to FIG. 10. It should be further noted that another structure of the amplitude modulation subcircuit 11, another structure of the pulse width modulation subcircuit 12, and another connection manner between the amplitude modulation subcircuit 11 and the pulse width modulation subcircuit 12 are applicable to the embodiments described in the present disclosure.

In some embodiments, the amplitude modulation subcircuit 11 includes any of the structures in FIG. 2 to FIG. 4, and the pulse width modulation subcircuit 12 does not include the bias stage. In other embodiments, the pulse width modulation subcircuit 12 includes any one of the structures of FIG. 5 to FIG. 7, and the amplitude modulation subcircuit 11 does not include the bias stage.

In some embodiments, the amplitude modulation subcircuit 11 includes a first drive transistor T11, the pulse width modulation subcircuit 12 includes a second drive transistor T21, the bias adjustment signal includes the first bias adjustment signal PAM_DVH and the second bias adjustment signal PWM_DVH, the first bias adjustment signal PAM_DVH is configured to adjust the bias state of the first drive transistor T11, and the second bias adjustment signal PWM_DVH is configured to adjust the bias state of the second drive transistor T21. A voltage of the first bias adjustment signal PAM_DVH is V1, a voltage of the second bias adjustment signal PWM_DVH is V2, and V1≠V2.

The working state of the first drive transistor T11 is different from the working state of the second drive transistor T21, and a difference exists between a restoring speed of the first drive transistor T11 from being turned off to being turned on and a restoring speed of the second drive transistor T21 from being turned off to being turned on. The bias state of the first drive transistor T11 and the bias state of the second drive transistor T21 are adjusted by using the same voltage. For one of the first drive transistor T11 and the second drive transistor T21, a voltage of the bias adjustment signal may be too large or too small, and the undercompensation or overcompensation is caused.

However, in the embodiments of the present disclosure, V1≠V2. In this way, the bias state of the first drive transistor T11 and the bias state of the second drive transistor T21 may be adjusted separately by using different voltages, so that different requirements of the first drive transistor T11 and the second drive transistor T21 are flexibly matched, which is conductive to reducing a difference between the first drive transistor T11 and the second drive transistor T21, and improving the undercompensation or overcompensation caused by the voltage of the bias adjustment signal being excessively large or excessively small. Therefore, functions of the amplitude modulation module and the pulse width modulation module may be better developed, thereby improving the design rationality.

Apparently, in other examples, V1=V2 may also be set. The same bias adjustment signal is provided to the first drive transistor T11 and the second drive transistor T21, that is, the first bias adjustment signal V1 is equal to the second bias adjustment signal V2. On one hand, the first drive transistor and the second drive transistor may be adjusted during the bias state, and on the other hand, the same bias adjustment signal may be used so as to reduce the design difficulty and the power consumption.

Exemplarily, in a case where the first drive transistor T11 is a P-type transistor, a voltage V1 of the first bias adjustment signal PAM_DVH may be greater than 0. In a case where the first drive transistor T11 is an N-type transistor, a voltage V1 of the first bias adjustment signal PAM_DVH may be less than 0. When the second drive transistor T21 is a P-type transistor, a voltage V2 of the second bias adjustment signal PWM_DVH may be greater than 0. In a case where the second drive transistor T21 is an N-type transistor, a voltage V2 of the second bias adjustment signal PWM_DVH may be less than 0. The bias adjustment signal may be adjusted in a direction to make the drive transistor more easily turned on.

In some embodiments, |V1|<|V2|.

For example, a drain-to-source voltage Vds1 of the first drive transistor T11 is generally less than a drain-to-source voltage Vds2 of the second drive transistor T21. Therefore, the absolute value of the voltage of the bias adjustment signal required by the first drive transistor T11 may be relatively small.

From another perspective, a drive current of the first drive transistor T11 is generally significantly greater than a drive current of the second drive transistor T21. The larger the driving current is, the larger the restoring speed of the bias state is when the drive transistor is on. Therefore, the absolute value of the voltage of the bias adjustment signal required for the first drive transistor T11 may be relatively small.

It should be noted that the foregoing description is merely some examples, and is not intended to limit the present disclosure.

In other embodiments, |V1|>|V2|.

For example, in a case where the drain-to-source voltage Vds2 of the second drive transistor T21 is less than the drain-to-source voltage Vds1 of the first drive transistor T11, the absolute value of the voltage of the bias adjustment signal required by the second drive transistor T21 may be relatively small.

From another perspective, in a case where the drive current of the second drive transistor T21 is significantly greater than the drive current of the first drive transistor T11, the larger the driving current is, the larger the restoring speed of the bias state is when the drive transistor is on. Therefore, the absolute value of the voltage of the bias adjustment signal required for the second drive transistor T21 may be relatively small.

In still other embodiments, V1=V2. For example, a voltage of the first bias adjustment signal PAM_DVH in a first time period is the same as a voltage of the second bias adjustment signal PWM_DVH in a second time period, and the first time period and the second time period are different time periods in the working process of the pixel circuit. A working cycle of the pixel circuit includes a data write frame and a retention frame. For example, one of the first time period and the second time period is the data write frame, and the other of the first time period and the second time period is the retention frame.

In some embodiments, the data write frame includes at least one bias stage, and the retention frame does not include the bias stage.

In some embodiments, the retention frame includes at least one bias stage, and the data write frame does not include the bias stage.

In some embodiments, the data write frame and the retention frame each includes at least one bias stage.

In some embodiments, the data write frame includes at least one first bias stage, and the retention frame does not include the first bias stage.

In some embodiments, the retention frame includes at least one first bias stage, and a data write frame does not include the first bias stage.

In some embodiments, the data write frame includes at least one second bias stage, and the retention frame does not include the second bias stage.

In some embodiments, the retention frame includes at least one second bias stage, and the data write frame does not include the second bias stage.

Figure 11:
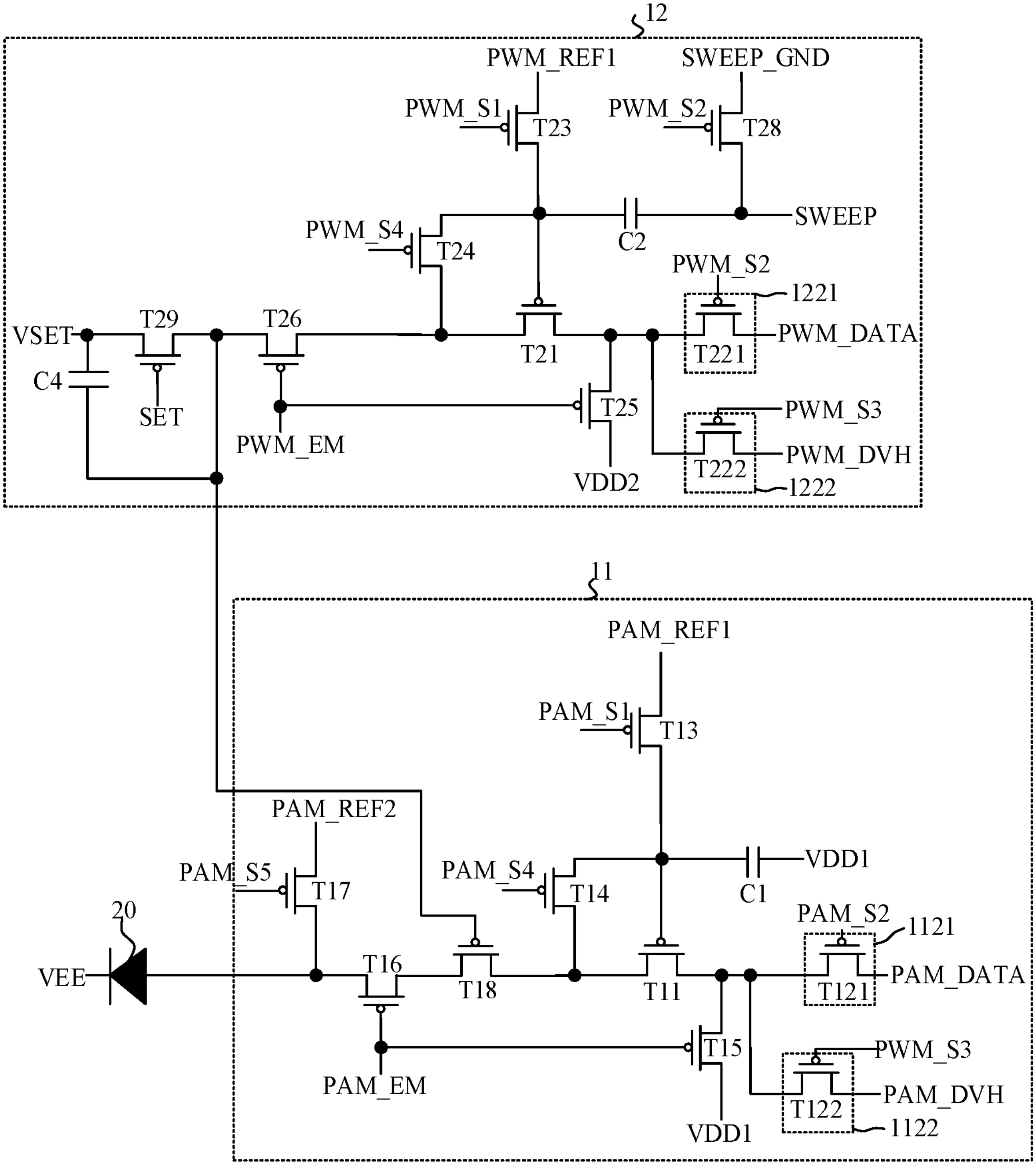
FIG. 11 shows a schematic structural diagram of a pixel circuit in a display panel according to an embodiment of the present disclosure.
Figure 12:
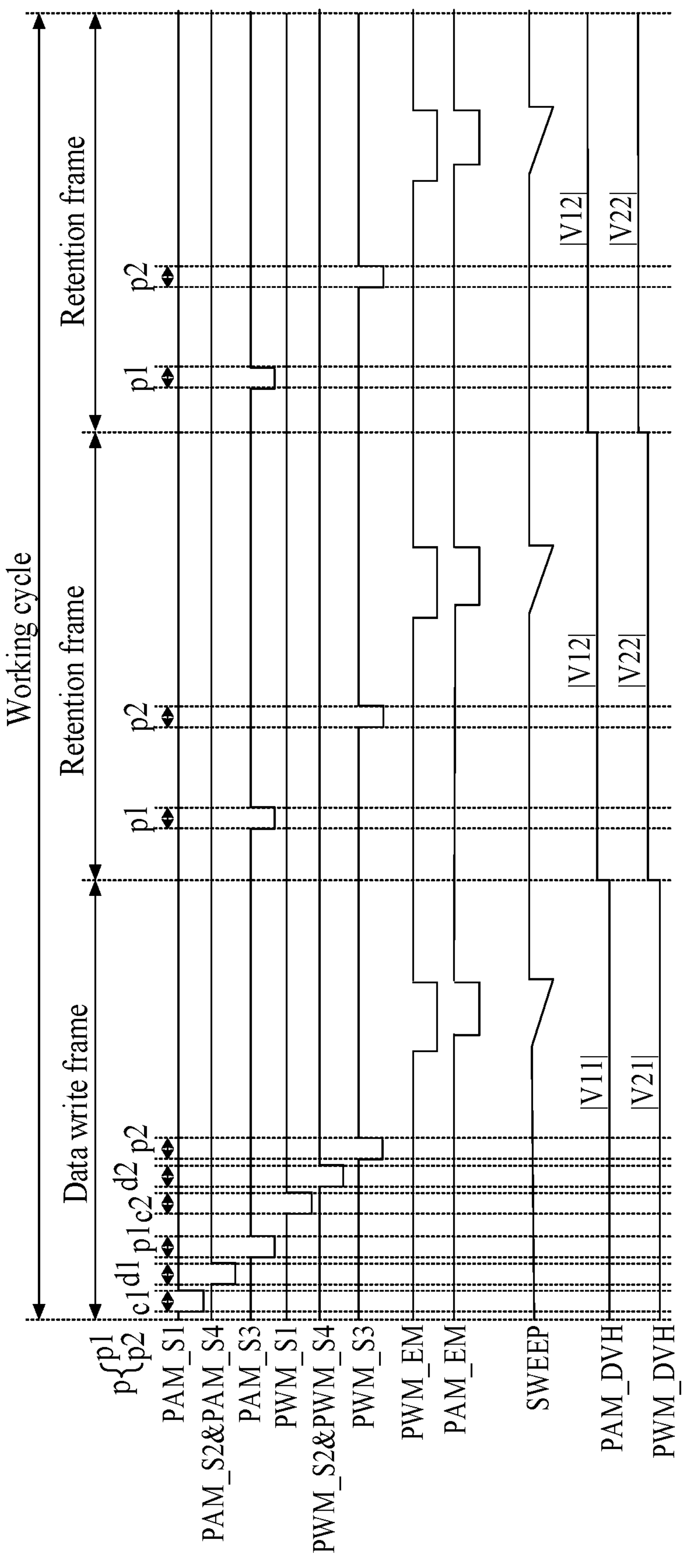
FIG. 12 shows a timing diagram of FIG. 11.

In some embodiments, referring to FIG. 11 and FIG. 12, the amplitude modulation subcircuit 11 includes a first drive transistor T11, the pulse width modulation subcircuit 12 includes a second drive transistor T21, the bias adjustment signal includes a first bias adjustment signal PAM_DVH and a second bias adjustment signal PWM_DVH, the first bias adjustment signal PAM_DVH is configured to adjust the bias state of the first drive transistor T11, and the second bias adjustment signal PWM_DVH is configured to adjust the bias state of the second drive transistor T21.

The working cycle of the pixel circuit includes the data write frame and the retention frame, and both the data write frame and the retention frame include at least one bias stage p.

A voltage of the first bias adjustment signal PAM_DVH in the data write frame is V11, a voltage of the first bias adjustment signal PAM_DVH in the retention frame is V12, and V11≠V12; and/or a voltage of the second bias adjustment signal PWM_DVH in the data write frame is V21, a voltage of the second bias adjustment signal PWM_DVH in the retention frame is V22, and V21≠V22.

In the embodiments of the present disclosure, V11≠V12. In this way, the bias state of the first drive transistor T11 may be adjusted by using different voltages in the data write frame and the retention frame, respectively, whereby it is more convenient to match different requirements of the first drive transistor T11 in different stages, and therefore, the function of the amplitude modulation module may be better played. Likewise, V21≠V22. In this way, the bias state of the second drive transistor T21 may be adjusted by using different voltages in the data write frame and the retention frame, respectively, whereby it is more convenient to match different requirements of the second drive transistor T21 in different stages, and therefore, the function of the pulse width modulation module may be better played.

It should be noted that the structure shown in FIG. 11 and the time sequence shown in FIG. 12 are merely some examples. The embodiments of the present disclosure are also applicable to other structures or time sequences of the pixel circuit. FIG. 11 shows that the pulse width modulation subcircuit 12 may further include a transistor T28. A first electrode of the transistor T28 receives a signal SWEEP_GND, a second electrode of the transistor T28 is connected to a first electrode of a second capacitor C2, and a gate of the transistor T28 is connected to a scan line PWM_S2. The pulse width modulation subcircuit 12 may-further include a transistor T29 and a fourth capacitor C4. The transistor T29 is connected between a signal terminal VSET and a second electrode of the second light-emitting control transistor T26, and a gate of the transistor T29 is connected to a signal line SET. The fourth capacitor C4 is connected between the signal terminal VSET and the gate of the first control transistor T18. The second electrode of the second light-emitting control transistor T26 is connected to the gate of the first control transistor T18.

In addition, FIG. 12 shows that the bias stage p includes a first bias stage p1 and a second bias stage p2. FIG. 12 further shows a first data write stage d1, a second data write stage d2, a first reset stage r1, and a second reset stage r2.

In some embodiments, V11=V12, V21≠V22.

In some embodiments, V11≠V12, V21=V22.

In some embodiments, V11≠V12, V21≠V22.

Apparently, in other examples, it may also be designed as V11=V12, V21=V22.

It should be further noted that, generally, with reference to FIG. 11 and FIG. 12, in the data write frame, the first data signal PAM_DATA is written into the gate of the first drive transistor T11, and the second data signal PWM_DATA is written into the gate of the second drive transistor T21. In the retention frame, the first data signal PAM_DATA and the second data signal PWM_DATA are no longer written. In other examples, the first data signal PAM_DATA may be written in the retention frame. In other examples, the second data signal PWM_DATA may also be written in the retention frame.

Exemplarily, at least one retention frame in the same working cycle includes a bias stage p. In another embodiment, all retention frames in the same working cycle may include a bias stage p. In yet another embodiment, a part of retention frames in the same working cycle may include a bias stage p, and another part of retention frames in the same working cycle may not include a bias stage p.

In some embodiments, |V11|<|V12| and/or |V21|<|V22|.

It is difficult to maintain a stable working state only by a storage capacitor in the pixel circuit due to transistor leakage, parasitic capacitive coupling, and other factors. Moreover, the longer the working time is, the more severe the offset in the threshold voltage of the drive transistor is, that is, the bias of the drive transistor is more severe.

In the embodiments of the present disclosure, in a case of $|V\mathbf{11}|<|V\mathbf{12}|$, a first bias adjustment signal with a relatively large absolute value of voltage may be used to adjust the bias state of the first drive transistor T11 in the retention frame, so as to improve the relatively serious bias condition of the first drive transistor T11 in the retention frame; and/or, in a case of $|V\mathbf{21}|<|V\mathbf{22}|$, a second bias adjustment signal with a relatively large absolute value of voltage may be used to adjust the bias state of the second drive transistor T21 in the retention frame, so as to improve the relatively serious bias condition of the second drive transistor T21 in the retention frame.

In some embodiments, the working cycle of the pixel circuit includes multiple retention frames, and at least two retention frames among the multiple retention frames include the bias stage. The voltage V12 of the first bias adjustment signal PAM_DVH remains unchanged in different retention frames of the same working cycle; and/or, the voltage V22 of the second bias adjustment signal PWM_DVH remains unchanged in different retention frames of the same working cycle.

In the embodiments of the present disclosure, the value of V12 in the multiple retention frames remains unchanged, and/or the value of V22 in the multiple retention frames remains unchanged. Therefore, it is relatively simple in timing and easy to implement.

For example, all retention frames in the working cycle include the bias stage. In each retention frame, the value of V12 may be the same, and/or the value of V22 may be the same.

Alternatively, a part of retention frames in the working cycle include the bias stage, and another part of retention frames in the working cycle does not include the bias stage. In each retention frame that has the bias stage, the value of V12 may be the same, and/or the value of V22 may be the same.

In other embodiments, the working cycle of the pixel circuit includes multiple retention frames, and at least two retention frames among the multiple retention frames include the bias stage. A voltage V12 of the first bias adjustment signal PAM_DVH is different in different retention frames in the same working cycle; and/or a voltage V22 of the second bias adjustment signal PWM_DVH is different in different retention frames in the same working cycle.

In the embodiments of the present disclosure, since values of V12 in different retention frames are different, the bias state of the first drive transistor T11 in different retention frames may be adjusted separately by using different voltages, so that different requirements of the first drive transistor T11 in different retention frames can be flexibly matched, the functions of the amplitude modulation module in different retention frames can be better exerted, and thus the design rationality is improved. Similarly, since values of V22 in different retention frames are different, the bias state of the second drive transistor T21 in different retention frames may be adjusted separately by using different voltages, so that different requirements of the second drive transistor T21 in different retention frames can be flexibly matched, the functions of the pulse width modulation module in different retention frames can be better exerted, and thus the design rationality is improved.

Exemplarily, in a case where at least three retention frames in the same working cycle include the bias stage, the voltage V12 of the first bias adjustment signal PAM_DVH is different in at least two retention frames, and/or the voltage V22 of the second bias adjustment signal PWM_DVH is different in at least two retention frames.

An example in which three retention frames in the same working cycle include the bias stage is used. In the three retention frames, the voltage V12 of the first bias adjustment signal PAM_DVH is different. Alternatively, in the two retention frames among the three retention frames, the voltage V12 of the first bias adjustment signal PAM_DVH is a first value, and in the other one retention frame among the three retention frames, the voltage V12 of the first bias adjustment signal PAM_DVH is a second value. The first value and the second value are different. The second bias adjustment signal PWM_DVH may be similarly designed, and details are not described herein again.

In some embodiments, the same working cycle includes an i-th retention frame and a j-th retention frame, and $i<j$. A voltage of the first bias adjustment signal PAM_DVH in the i-th retention frame is $V\mathbf{12}i$, a voltage of the first bias adjustment signal PAM_DVH in the j-th retention frame is $V\mathbf{12}j$, and $|V\mathbf{12}i|<|V\mathbf{12}j|$; and/or a voltage of the second bias adjustment signal PWM_DVH in the i-th retention frame is $V\mathbf{22}i$, a voltage of the second bias adjustment signal PWM_DVH in the j-th retention frame is $V\mathbf{22}j$, and $|V\mathbf{22}i|<|V\mathbf{22}j|$.

In the embodiments of the present disclosure, in a case of $|V\mathbf{12}i|<|V\mathbf{12}j|$, the first bias adjustment signal with a larger absolute value of voltage may be used to adjust the bias state of the first drive transistor T11 in the latter retention frame, thereby improving the relatively severe bias condition of the first drive transistor T11 in the latter retention frame; and/or in a case of $|V\mathbf{22}i|<|V\mathbf{22}j|$, the second bias adjustment signal with a larger absolute value of voltage may be used to adjust the bias state of the second drive transistor T21 in the latter retention frame, thereby improving the relatively severe bias condition of the second drive transistor T21 in the latter retention frame.

Exemplarily, i and j may be equal, or may be different.

As an example, as shown in FIG. 12, in the same working cycle, from the first retention frame to the last retention frame, the absolute value of voltage of the first bias adjustment signal PAM_DVH may be gradually increased, and/or the absolute value of voltage of the second bias adjustment signal PWM_DVH may be gradually increased.

In another example, multiple retention frames in the same working cycle may be divided into multiple retention groups, and at least one retention group among the multiple retention groups includes at least two retention frames. In the same working cycle, from the first retention group to the last retention group, the absolute value of voltage of the first bias adjustment signal PAM_DVH may be gradually increased, and the absolute value of voltage of the first bias adjustment signal PAM_DVH remains unchanged in the same retention group; and/or, from the first retention group to the last retention group, the absolute value of voltage of the second bias adjustment signal PWM_DVH may be gradually increased, and the absolute value of voltage of the second bias adjustment signal PWM_DVH remains unchanged in the same retention group.

In some embodiments, the amplitude modulation subcircuit 11 includes a first drive transistor T11, the pulse width modulation subcircuit 12 includes a second drive transistor T21, the bias adjustment signal includes a first bias adjustment signal PAM_DVH and a second bias adjustment signal PWM_DVH, the first bias adjustment signal PAM_DVH is configured to adjust the bias state of the first drive transistor T11, and the second bias adjustment signal PWM_DVH is configured to adjust the bias state of the second drive transistor T21.

Figure 13:
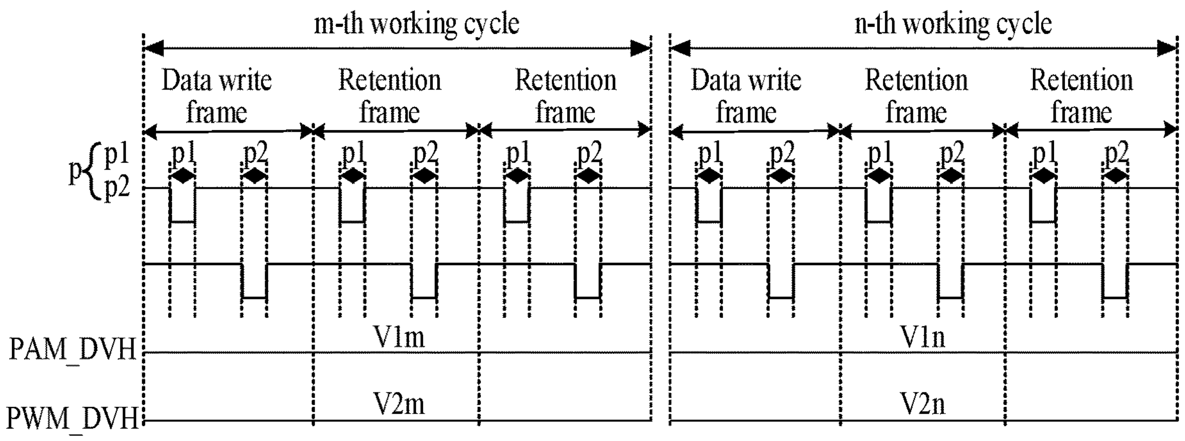
FIG. 13 shows a timing diagram of a pixel circuit in a display panel.
Figure 14:
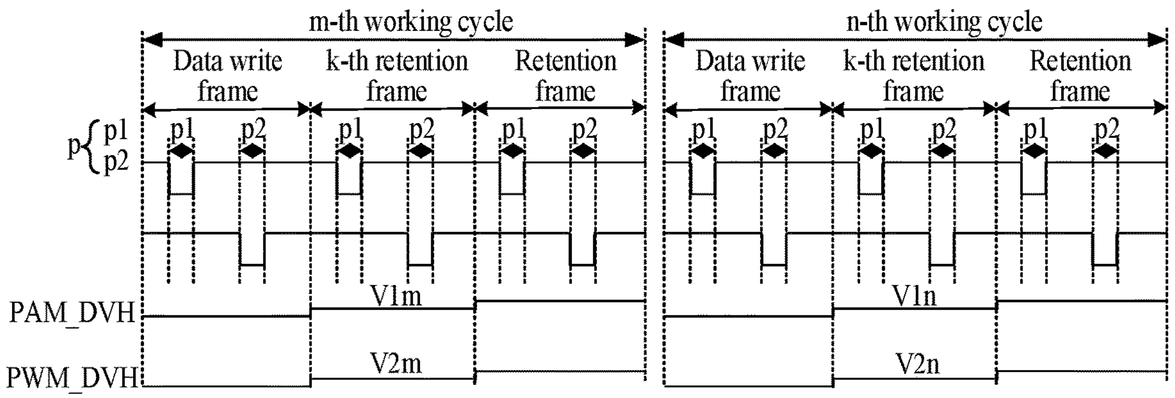
FIG. 14 shows another timing diagram of a pixel circuit in a display panel.

Referring to FIG. 13 or FIG. 14, the working process of a pixel circuit includes multiple working cycles, the multiple working cycles include an m-th working cycle and an n-th working cycle, and $m \neq n$. Both the m-th working cycle and the n-th working cycle include at least one bias stage p. For example, both the m-th working cycle and the n-th working cycle include at least one first bias stage p1 and at least one second bias stage p2.

A voltage of the first bias adjustment signal PAM_DVH in the m-th working cycle is $V1m$, a voltage of the first bias adjustment signal PAM_DVH in the n-th working cycle is $V1n$, and $V1m=V1n$; and/or, a voltage of the second bias adjustment signal PWM_DVH in the m-th working cycle is $V2m$, a voltage of the second bias adjustment signal PWM_DVH in the n-th working cycle is $V2n$, and $V2m=V2n$.

In the embodiments of the present disclosure, the value of the first bias adjustment signal PAM_DVH in different working cycles may remain unchanged, and/or the value of the second bias adjustment signal PWM_DVH in different working cycles may remain unchanged. Therefore, it is relatively simple in timing and easy to implement.

Exemplarily, the m-th working cycle and the n-th working cycle each may include a data write frame and a retention frame.

As an example, as shown in FIG. 13, in the same working cycle, a voltage of the first bias adjustment signal PAM_DVH in the data write frame and the retention frame may be the same; and/or, a voltage of the second bias adjustment signal PWM_DVH in the data write frame and the retention frame may be the same.

In another example, as shown in FIG. 14, the voltage of the first bias adjustment signal PAM_DVH in the data write frame and the retention frame may be different, the voltage of the first bias adjustment signal PAM_DVH is the same in the data write frame of the m-th working cycle and the data write frame of the n-th working cycle, the voltage of the first bias adjustment signal PAM_DVH is the same in the k-th retention frame of the m-th working cycle and the k-th retention frame of the n-th working cycle, and the k-th retention frame is any one of the multiple retention frames; and/or, the voltage of the second bias adjustment signal PWM_DVH in the data write frame and the retention frame may be different, the voltage of the second bias adjustment signal PWM_DVH is the same in the data write frame of the m-th working cycle and the data write frame of the n-th working cycle, and the voltage of the second bias adjustment signal PWM_DVH is the same in the k-th retention frame of the m-th working cycle and the k-th retention frame of the n-th working cycle.

In other embodiments, the amplitude modulation subcircuit 11 includes a first drive transistor T11, the pulse width modulation subcircuit 12 includes a second drive transistor T21, the bias adjustment signal includes a first bias adjustment signal PAM_DVH and a second bias adjustment signal PWM_DVH, the first bias adjustment signal PAM_DVH is configured to adjust the bias state of the first drive transistor T11, and the second bias adjustment signal PWM_DVH is configured to adjust the bias state of the second drive transistor T21.

Figure 15:
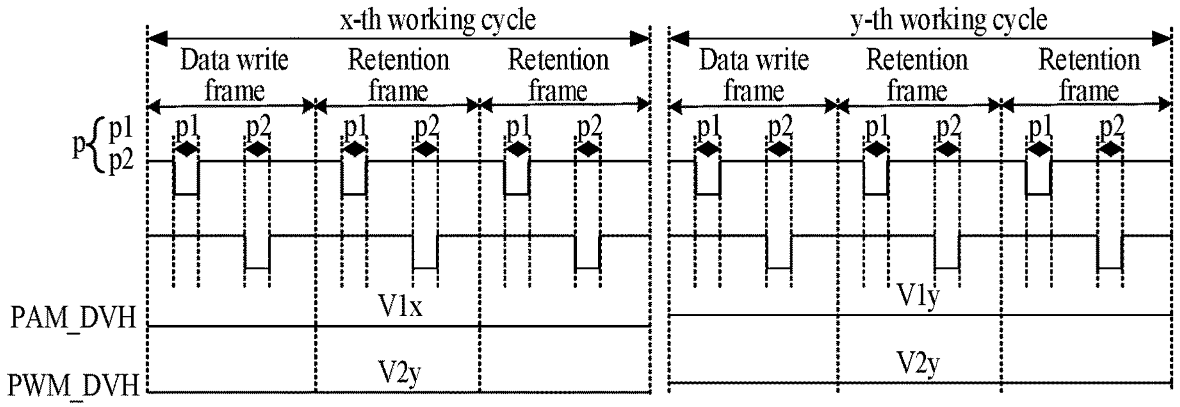
FIG. 15 shows still another timing diagram of a pixel circuit in a display panel.
Figure 16:
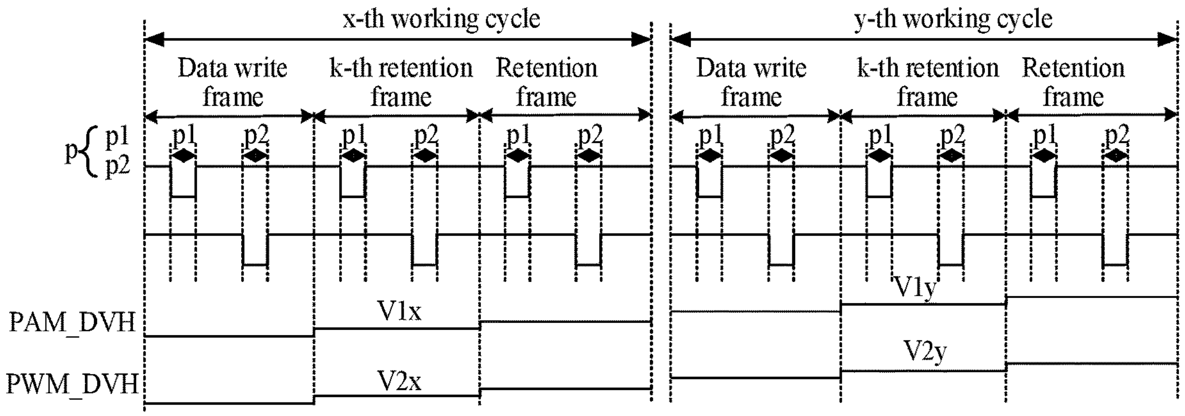
FIG. 16 shows still another timing diagram of a pixel circuit in a display panel.

Referring to FIG. 15 or FIG. 16, the working process of the pixel circuit includes multiple working cycles, the multiple working cycles include an x-th working cycle and a y-th working cycle, and $x \neq y$. Both the x-th working cycle and the y-th working cycle include at least one bias stage p. For example, both the x-th working cycle and the y-th working cycle include at least one first bias stage p1 and at least one second bias stage p2.

A voltage of the first bias adjustment signal PAM_DVH in the x-th working cycle is $V1x$, a voltage of the first bias adjustment signal PAM_DVH in the y-th working cycle is $V1y$, and $V1x \neq V1y$; and/or, a voltage of the second bias adjustment signal PWM_DVH in the x-th working cycle is $V2x$, a voltage of the second bias adjustment signal PWM_DVH in the y-th working cycle is $V2y$, and $V2x \neq V2y$.

In the embodiments of the present disclosure, since values of the first bias adjustment signal PAM_DVH in different working cycles are different, the bias state of the first drive transistor T11 in different working cycles may be adjusted separately by using different voltages, so that different requirements of the first drive transistor T11 in different working cycles can be flexibly matched, the functions of the amplitude modulation module in different retention frames can be better exerted, and thus the design rationality is improved. Similarly, since values of the second bias adjustment signal PWM_DVH in different working cycles are different, the bias state of the second drive transistor T21 in different working cycles may be adjusted separately by using different voltages, so that different requirements of the second drive transistor T21 in different working cycles can be flexibly matched, the functions of the pulse width modulation module in different retention frames can be improved, and thus the design rationality is improved.

Exemplarily, the x-th working cycle and the y-th working cycle each may include a data write frame and a retention frame.

As an example, as shown in FIG. 15, in the same working cycle, a voltage of the first bias adjustment signal PAM_DVH in the data write frame and the retention frame may be the same; and/or, a voltage of the second bias adjustment signal PWM_DVH in the data write frame and the retention frame may be the same.

In another example, as shown in FIG. 16, the voltage of the first bias adjustment signal PAM_DVH in the data write frame and the retention frame may be different, the voltage of the first bias adjustment signal PAM_DVH is different in the data write frame of the x-th working cycle and the data write frame of the y-th working cycle, the voltage of the first bias adjustment signal PAM_DVH is different in the k-th retention frame of the x-th working cycle and the k-th retention frame of the y-th working cycle, and the k-th retention frame is any one of the multiple retention frames; and/or, the voltage of the second bias adjustment signal PWM_DVH in the data write frame and the retention frame may be different, the voltage of the second bias adjustment signal PWM_DVH is different in the data write frame of the x-th working cycle and the data write frame of the y-th working cycle, and the voltage of the second bias adjustment signal PWM_DVH is different in the k-th retention frame of the x-th working cycle and the k-th retention frame of the y-th working cycle.

As an example, $x<y \cdot |V1x|<|V1y|$ and/or $|V2x|<|V2y|$.

In some embodiments, the number of bias stages of the amplitude modulation subcircuit 11 within a target time period is a1, the number of bias stages of the pulse width modulation subcircuit 12 within the target time period is b1, and $a1<b1$.

For example, in the pixel circuit, the pulse width modulation subcircuit 12 is connected to a gate of a first drive transistor in the amplitude modulation subcircuit 11. In the pixel circuit, if a second drive transistor of the pulse width modulation subcircuit 12 cannot be quickly turned on, the brightness waveform may be smearing from turning on to turning off, which can easily lead to the display panel having the smearing. For another example, in the pixel circuit, the pulse width modulation subcircuit 12 is connected to the control transistor in the amplitude modulation subcircuit 11. In the pixel circuit, if a second drive transistor of the pulse width modulation subcircuit 12 cannot be quickly turned on, a delay occurs in the brightness waveform from being turned off to being turned on, which may cause long response time of the display panel. Therefore, the bias adjustment is more necessary for the pulse width modulation subcircuit 12.

In the embodiments of the present disclosure, the pulse width modulation subcircuit 12 includes more bias stages in the target time period, and performs the bias adjustment of the second drive transistor of the pulse width modulation subcircuit 12 more times, which is conductive to improving the smearing in the display panel or the long response time of the display panel.

Exemplarily, one target time period may include one working cycle. Apparently, one target time period may also include multiple working cycles.

As an example, the working cycle includes the data write frame and the retention frame. The data write frames of the amplitude modulation subcircuit 11 and the pulse width modulation subcircuit 12 may include the bias stage. The retention frame of the amplitude modulation subcircuit 11 does not include the bias stage, and the retention frame of the pulse width modulation subcircuit 12 includes the bias stage, so that $a1<b1$.

In another example, the working cycle includes a data write frame and multiple retention frames. The data write frames of the amplitude modulation subcircuit 11 and the pulse width modulation subcircuit 12 may include the bias stage. A part of retention frames of the amplitude modulation subcircuit 11 include the bias stage, another part of retention frames of the amplitude modulation subcircuit 11 do not include the bias stage, and all retention frames of the pulse width modulation subcircuit 12 include the bias stage, so that $a1<b1$.

It should be noted that a design manner of the $a1<b1$ may include, but is not limited to, the above-described example.

Apparently, in another example, $a1=b1$ may also be designed as required.

In some embodiments, the amplitude modulation subcircuit 11 includes a first drive transistor T11, the pulse width modulation subcircuit 12 includes a second drive transistor T21, the bias adjustment signal includes a first bias adjustment signal PAM_DVH and a second bias adjustment signal PWM_DVH, the first bias adjustment signal PAM_DVH is configured to adjust the bias state of the first drive transistor T11, and the second bias adjustment signal PWM_DVH is configured to adjust the bias state of the second drive transistor T21.

The display panel 100 may support multiple refresh frequencies, for example, the display panel may support the first refresh frequency and the second refresh frequency. The first refresh frequency is different from the second refresh frequency. For example, the first refresh frequency is 60 HZ, and the second refresh frequency is 90 HZ. For another example, the first refresh frequency is 120 HZ, and the second refresh frequency is 30 HZ.

A voltage of the first bias adjustment signal PAM_DVH at the first refresh frequency is $V\mathbf{1}_{F1}$, a voltage of the first bias adjustment signal PAM_DVH at the second refresh frequency is $V\mathbf{1}_{F2}$, and $V\mathbf{1}_{F1} \neq V\mathbf{1}_{F2}$; and/or, a voltage of the second bias adjustment signal PWM_DVH at the first refresh frequency is $V\mathbf{2}_{F1}$, a voltage of the second bias adjustment signal PWM_DVH at the second refresh frequency is $V\mathbf{2}_{F2}$, and $V\mathbf{2}_{F1} \neq V\mathbf{2}_{F2}$.

Working states of the first drive transistor T11 at different refresh frequencies are different, and restoring speeds of the first drive transistor T11 from being turned off to being turned on at different refresh frequencies are different. The bias state of the first drive transistor T11 at different refresh frequencies is adjusted by using the same voltage. For one of the refresh frequencies, the voltage of the bias adjustment signal may be too large or too small, and the undercompensation or overcompensation is caused. Similarly, working states of the second drive transistor T21 at different refresh frequencies are different, and restoring speeds of the second drive transistor T21 from being turned off to being turned on at different refresh frequencies are different. The bias state of the second drive transistor T21 at different refresh frequencies is adjusted by using the same voltage. For one of the refresh frequencies, the voltage of the bias adjustment signal may be too large or too small, and the undercompensation or overcompensation is caused.

However, in the embodiments of the present disclosure, $V\mathbf{1}_{F1} \neq V\mathbf{1}_{F2}$. In this way, the bias state of the first drive transistor T11 at different refresh frequencies may be separately adjusted by using different voltages, so that different requirements of the first drive transistor T11 at different refresh frequencies are flexibly matched, which is conductive to reducing the difference between the first drive transistor T11 at different refresh frequencies, and improving the undercompensation or overcompensation caused by too large or too small voltage of the bias adjustment signal. Likewise, $V\mathbf{2}_{F1} \neq V\mathbf{2}_{F2}$, the bias state of the second drive transistor T21 at different refresh frequencies may be adjusted separately by using different voltages, so that different requirements of the second drive transistor T21 at different refresh frequencies are flexibly matched, which is conductive to reducing the difference between the second drive transistor T21 at different refresh frequencies, and improving the undercompensation or overcompensation caused by too large or too small voltage of the bias adjustment signal.

It should be noted that the refresh frequency refers to the frequency at which a data signal DATA is effectively written to the gate of the drive transistor. When the refresh frequency is larger, it is indicated that the frequency of change of the gate potential of the drive transistor is larger. On the contrary, when the refresh frequency is smaller, it is indicated that the frequency of change of the gate potential of the drive transistor is smaller.

In some embodiments, $V\mathbf{1}_{F1}=V\mathbf{1}_{F2}$, $V\mathbf{2}_{F1} \neq V\mathbf{2}_{F2}$.

In some embodiments, $V\mathbf{1}_{F1} \neq V\mathbf{1}_{F2}$, $V\mathbf{2}_{F1}=V\mathbf{2}_{F2}$.

In some embodiments, $V\mathbf{1}_{F1} \neq V\mathbf{1}_{F2}$, $V\mathbf{2}_{F1} \neq V\mathbf{2}_{F2}$.

Apparently, in another example, it may also be designed as $V\mathbf{1}_{F1}=V\mathbf{1}_{F2}$, $V\mathbf{2}_{F1}=V\mathbf{2}_{F2}$.

In some embodiments, in a case where the first refresh frequency is greater than the second refresh frequency, $|V\mathbf{1}_{F1}|<|V\mathbf{1}_{F2}|$ and/or $|V\mathbf{2}_{F1}|<|V\mathbf{2}_{F2}|$.

In a low refresh frequency mode, a data signal DATA is written into a gate of a drive transistor of the amplitude modulation subcircuit 11 and the pulse width modulation subcircuit 12 only in the data write frame. Since the refresh speed of a low refresh frequency is relatively slow, it is difficult to maintain the stable working state only by using the storage capacitor of the pixel circuit. In addition, due to transistor leakage, parasitic capacitive coupling, and other factors, as the refresh frequency decreases, the offset in the threshold voltage of the drive transistor becomes more severe, i.e., the bias of the drive transistor is more severe. In this case, the flicker degree of the display panel may increase as the refresh frequency decreases.

In the embodiments of the present disclosure, in a case where the first refresh frequency is greater than the second refresh frequency, $|V1_{F1}|<|V1_{F2}|$ and/or $|V2_{F1}|<|V2_{F2}|$. In this way, the voltage value of the bias adjustment signal is increased at the low refresh frequency, so that the relatively serious bias condition of the drive transistor at the low refresh frequency is improved, and the flicker of the display panel at the low refresh frequency is improved.

In some embodiments, the amplitude modulation subcircuit 11 includes a first drive transistor T11, the pulse width modulation subcircuit 12 includes a second drive transistor T21, the bias adjustment signal includes a first bias adjustment signal PAM_DVH and a second bias adjustment signal PWM_DVH, the first bias adjustment signal PAM_DVH is configured to adjust the bias state of the first drive transistor T11, and the second bias adjustment signal PWM_DVH is configured to adjust the bias state of the second drive transistor T21.

The working module of the display panel includes a first brightness mode and a second brightness mode, and the brightness of the display panel in the first brightness mode is different from the brightness of the display panel in the second brightness mode.

A voltage of the first bias adjustment signal PAM_DVH in the first brightness mode is $V1_{L1}$, a voltage of the first bias adjustment signal PAM_DVH in the second brightness mode is $V1_{L2}$, and $V_{L1}\neq V1_{L2}$; and/or, a voltage of the second bias adjustment signal PWM_DVH in the first brightness mode is $V2_{L1}$, a voltage of the second bias adjustment signal PWM_DVH in the second brightness mode is $V2_{L2}$, and $V2_{L1}\neq V2_{L2}$.

The working state of the first drive transistor T11 in different brightness modes is different. The bias state of the first drive transistor T11 in different brightness modes is adjusted by using the same voltage. For one brightness mode, the voltage of the bias adjustment signal may be too large or too small, and the undercompensation or overcompensation is caused. Similarly, the working state of the second drive transistor T21 in different brightness modes is different. The bias state of the second drive transistor T21 in different brightness modes is adjusted by using the same voltage. For one brightness mode, the voltage of the bias adjustment signal may be too large or too small, and the undercompensation or overcompensation is caused.

However, in the embodiments of the present disclosure, $V1_{L1}\neq V1_{L2}$. In this way, the bias state of the first drive transistor T11 in different brightness modes may be adjusted separately by using different voltages, so that different requirements of the first drive transistor T11 in different brightness modes are flexibly matched, which is conductive to reducing a difference between the first drive transistor T11 in different brightness modes, and improving the undercompensation or overcompensation caused by the voltage of the bias adjustment signal being too large or too small. Likewise, $V2_{L1}\neq V2_{L2}$. In this way, the bias state of the second drive transistor T21 in different brightness modes may be adjusted separately by using different voltages, so that different requirements of the second drive transistor T21 in different brightness modes are flexibly matched, which is conductive to reducing a difference between the second drive transistor T21 in different brightness modes, and improving the undercompensation or overcompensation caused by the voltage of the bias adjustment signal being too large or too small.

In some embodiments, $V1_{L1}=V1_{L2}$, $V2_{L1}\neq V2_{L2}$.

In some embodiments, $V1_{L1}\neq V1_{L2}$, $V2_{L1}=V2_{L2}$.

In some embodiments, $V1_{L1}\neq V1_{L2}$, $V2_{L1}\neq V2_{L2}$.

Apparently, in another example, it may also be designed as $V1_{L1}=V1_{L2}$, $V2_{L1}=V2_{L2}$.

In some embodiments, the brightness of the display panel in the first brightness mode is less than the brightness of the display panel in the second brightness mode; $|V1_{L1}|<|V1_{L2}|$ and/or $|V2_{L1}|>|V2_{L2}|$.

Generally, the brightness is the higher, the working time of the first drive transistor T11 is the longer, and the working time of the second drive transistor T21 is the shorter. Therefore, the brightness is the higher, and an adjustment voltage with a greater absolute value may be used to adjust the bias state of the first drive transistor T11; the brightness is the higher, and an adjustment voltage with a lower absolute value may be used to adjust the bias state of the second drive transistor T21.

Apparently, in another example, as brightness increases, the absolute value of voltage of the second bias adjustment signal may not decrease.

In some embodiments, the amplitude modulation subcircuit 11 includes a first drive transistor T11, the pulse width modulation subcircuit 12 includes a second drive transistor T21, the bias adjustment signal includes a first bias adjustment signal PAM_DVH and a second bias adjustment signal PWM_DVH, the first bias adjustment signal PAM_DVH is configured to adjust the bias state of the first drive transistor T11, and the second bias adjustment signal PWM_DVH is configured to adjust the bias state of the second drive transistor T21.

Figure 17:
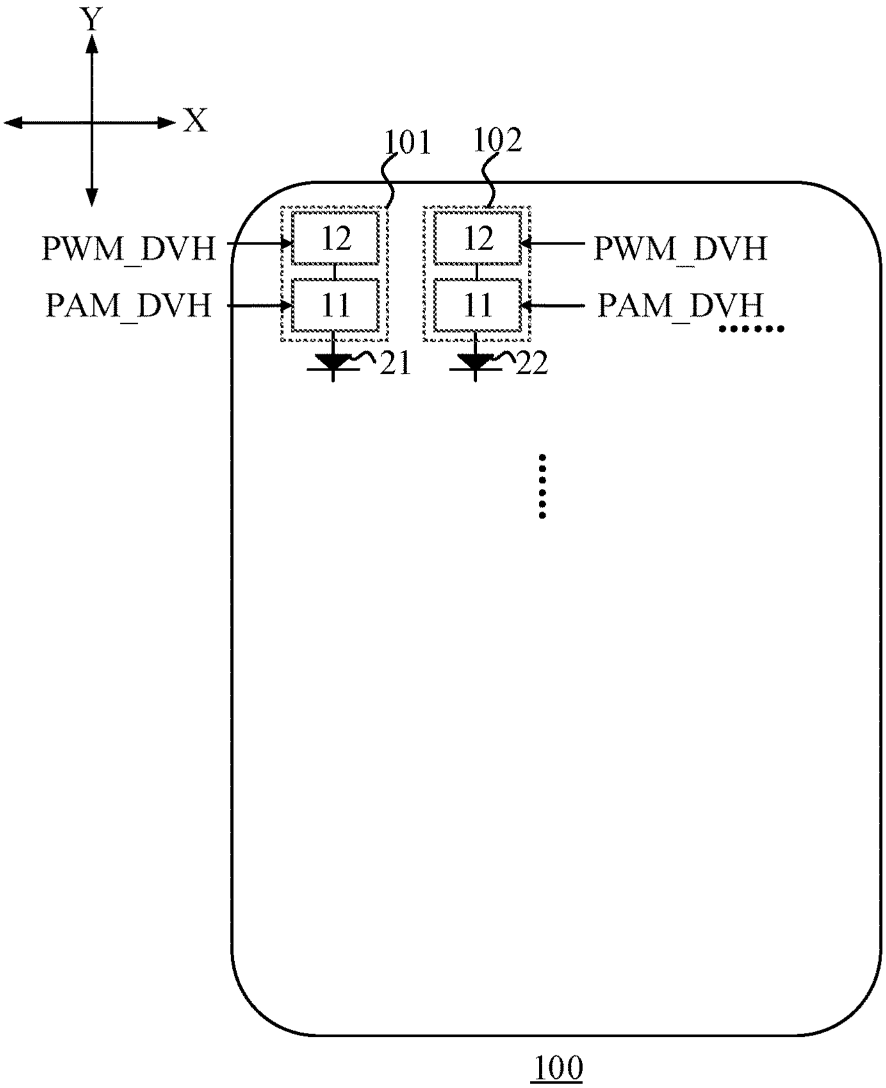
FIG. 17 shows another schematic structural diagram of a display panel according to an embodiment of the present disclosure.

As shown in FIG. 17, the pixel circuit 10 includes a first pixel circuit 101 and a second pixel circuit 102, the light-emitting element 20 includes a first light-emitting element 21 and a second light-emitting element 22, the first pixel circuit 101 is configured to drive the first light-emitting element 21, the second pixel circuit 102 is configured to drive the second light-emitting element 22, and the light-emitting color of the first light-emitting element 21 is different from the light-emitting color of the second light-emitting element 22.

A voltage value of the first bias adjustment signal PAM_DVH written into the first pixel circuit 101 is V13, a voltage value of the second bias adjustment signal PWM_DVH written into the first pixel circuit 101 is V23, a voltage value of the first bias adjustment signal PAM_DVH written into the second pixel circuit 102 is V14, and a voltage value of the second bias adjustment signal PWM_DVH written into the second pixel circuit 102 is V24, where V13≠V14, and/or V23≠V24.

Characteristics of light-emitting elements of different light-emitting colors are different, and driving requirements of light-emitting elements of different light-emitting colors are also different. Therefore, the reset requirement of driver circuits of light-emitting elements of different light-emitting colors is also different. In the embodiments of the present disclosure, V13≠V14, and/or V23≠V24. According to different requirements of light-emitting elements of different light-emitting colors, the magnitude of the corresponding bias adjustment voltage may be set flexibly, thereby further improving the design rationality.

In some embodiments, V13=V14, V23≠V24.

In some embodiments, V13≠V14, V23=V24.

In some embodiments, V13≠V14, V23≠V24.

Apparently, in other examples, V13=V14 and V23=V24 may also be designed as required.

In some embodiments, the first light-emitting element 21 includes a red light-emitting element, and the second light-emitting element 22 includes at least one of a green light-emitting element or a blue light-emitting element, where |V13|>|V14| and/or |V23|>|V24|.

Generally, I_R>I_G>I_B, I_R represents a drive current required by the red light-emitting element, I_G represents a drive current required by the green light-emitting element, and I_B represents a drive current required by the blue light-emitting element. Therefore, |V13_R|>|V14_G|>|V14_B| may be set, V13_R represents a voltage value of the first bias adjustment signal PAM_DVH received by the first drive transistor that drives the red light-emitting element, V14_G represents a voltage value of the first bias adjustment signal PAM_DVH received by the first drive transistor that drives the green light-emitting element, and V14_B represents a voltage value of the first bias adjustment signal PAM_DVH received by the first drive transistor that drives the blue light-emitting element.

Generally, the light-emitting time of the red light-emitting element, the green light-emitting element and the blue light-emitting element are the same. To implement I_R>I_G>I_B, Q_R>Q_G>Q_B is required. Q_R represents a charge amount charged by the pulse width modulation subcircuit 12 that drives the red light-emitting element to the storage capacitor in the amplitude modulation subcircuit 11. Q_G represents a charge amount charged by the pulse width modulation subcircuit 12 that drives the green light-emitting element to the storage capacitor in the amplitude modulation subcircuit 11. Q_B represents a charge amount charged by the pulse width modulation subcircuit 12 that drives the blue light-emitting element to the storage capacitor in the amplitude modulation subcircuit 11. Therefore, |V23_R|>|V24_G|>|V24_B| may be set. V23_R represents a voltage value of the second bias adjustment signal PWM_DVH received by the second drive transistor that drives the red light-emitting element, V24_G represents a voltage value of the second bias adjustment signal PWM_DVH received by the second drive transistor that drives the green light-emitting element, and V24_B represents a voltage value of the second bias adjustment signal PWM_DVH received by the second drive transistor that drives the blue light-emitting element.

It should be noted that the transistor in the embodiments of the present disclosure may be an N-type transistor, or may be a P-type transistor. For the N-type transistors, the ON level is a high level, and the OFF level is a low level. That is, when the gate potential of the N-type transistor is at a high level, the first electrode and the second electrode of the N-type transistor are conductive, and when the gate potential of the N-type transistor is at a low level, the first electrode and the second electrode of the N-type transistor are not conductive. For the P-type transistor, the ON level is a low level, and the OFF level is a high level. That is, when the gate potential of the P-type transistor is at a low level, the first electrode and the second electrode of the P-type transistor are conductive, and when the gate potential of the P-type transistor is at a high level, the first electrode and the second electrode of the P-type transistor are not conductive. In an implementation, the gate of the foregoing transistor is used as the control electrode of the foregoing transistor. According to a signal driving the gate of each transistor and the type of the transistor, a first electrode of the foregoing transistor may be used as a source, and a second electrode of the foregoing transistor is used as a drain; or a first electrode of the foregoing transistor is used as a drain, and a second electrode of the foregoing transistor is used as a source. The source and drain of the foregoing transistors are not distinguished herein. The source and drain of the transistor may sometimes be used interchangeably, and the source and drain of the transistor may sometimes be collectively referred to as the source drain. In addition, both the on-level and the off-level in the embodiments of the present disclosure are generic, the on-level refers to any level that enables the transistor to be on, and the off-level refers to any level that enables the transistor to be off/cut off.

An embodiment of the present disclosure further provides a driving method of a display panel.

As shown in FIG. 1, the display panel 100 includes a pixel circuit 10 and a light-emitting element 20.

The pixel circuit 10 is connected to the light-emitting element 20, and the pixel circuit 10 is configured to drive the light-emitting element 20 to emit light.

The pixel circuit 10 includes an amplitude modulation subcircuit 11 and a pulse width modulation subcircuit 12. The amplitude modulation subcircuit 11 is connected to the pulse width modulation subcircuit 12. The amplitude modulation subcircuit 11 and the pulse width modulation subcircuit 12 each includes a drive transistor.

The working process of at least one of the amplitude modulation subcircuit 11 or the pulse width modulation subcircuit 12 includes the bias stage.

Figure 18:
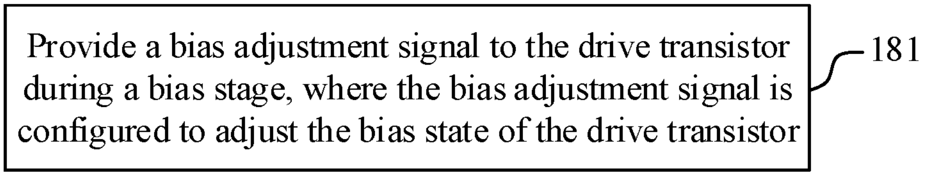
FIG. 18 shows a schematic flowchart of a driving method of a display panel according to an embodiment of the present disclosure.

As shown in FIG. 18, the driving method of the display panel includes step 181.

In step 181, during a bias stage, a bias adjustment signal is provided to the drive transistor, where the bias adjustment signal is configured to adjust the bias state of the drive transistor.

In the embodiments of the present disclosure, for the pixel circuit that includes the amplitude modulation subcircuit 11 and the pulse width modulation subcircuit 12, the bias stage is introduced so that the bias adjustment signal may be input to the source or drain of the drive transistor, thereby reducing the offset of the threshold voltage of the transistor, effectively improving the "hysteresis" phenomenon of the transistor, and facilitating the optimization of the performance of the pixel circuit.

In some embodiments, the working process of the pulse width modulation subcircuit includes a second data write stage and a second bias stage. The pulse width modulation subcircuit includes a second data write module, and the second data write module is configured to write a second data signal during the second data write stage, and is configured to write a second bias adjustment signal during the second bias stage. Alternatively, the pulse width modulation subcircuit includes a second data write module and a second bias module. The second data write module is configured to write the second data signal during the second data write stage, and the second bias module is configured to write the second bias adjustment signal during the second bias stage. Alternatively, the working process of the pulse width modulation subcircuit includes a second reset stage, and the pulse width modulation subcircuit includes a second reset module. The second reset module is configured to write a second reset signal during the second reset stage, and is configured to write the second bias adjustment signal during the second bias stage.

In some embodiments, the amplitude modulation subcircuit includes a first drive transistor, the pulse width modulation subcircuit includes a second drive transistor, the bias adjustment signal includes a first bias adjustment signal and a second bias adjustment signal, the first bias adjustment signal is configured to adjust the bias state of the first drive transistor, and the second bias adjustment signal is configured to adjust the bias state of the second drive transistor. The driving method includes that: a voltage of the first bias adjustment signal is controlled to be V1, a voltage of the second bias adjustment signal is controlled to be V2, and V1≠V2.

In some embodiments, |V1|>|V2|.

In some embodiments, |V1|<|V2|.

In some embodiments, the amplitude modulation subcircuit includes a first drive transistor, the pulse width modulation subcircuit includes a second drive transistor, the bias adjustment signal includes a first bias adjustment signal and a second bias adjustment signal, the first bias adjustment signal is configured to adjust the bias state of the first drive transistor, and the second bias adjustment signal is configured to adjust the bias state of the second drive transistor. A working cycle of the pixel circuit includes a data write frame and a retention frame, and the data write frame and the retention frame each includes at least one bias stage. The driving method includes: a voltage of the first bias adjustment signal in the data write frame is controlled to be V11, a voltage of the first bias adjustment signal in the retention frame is controlled to be V12, and V11≠V12; and/or a voltage of the second bias adjustment signal in the data write frame is controlled to be V21, a voltage of the second bias adjustment signal in the retention frame is controlled to be V22, and V21≠V22.

In some embodiments, |V11|<|V12| and/or |V21|<|V22|.

In some embodiments, the working cycle of the pixel circuit includes multiple retention frames, and at least two retention frames among the multiple retention frames include the bias stage. The driving method includes: V12 is controlled to be unchanged in different retention frames of the same working cycle; and/or V22 is controlled to be unchanged in different retention frames of the same working cycle.

In some embodiments, the working cycle of the pixel circuit includes multiple retention frames, and at least two retention frames among the multiple retention frames include the bias stage. The driving method includes: V12 is controlled to be different in different retention frames of the same working cycle; and/or V22 is controlled to be different in different retention frames of the same working cycle.

In some embodiments, the same working cycle includes an i-th retention frame and a j-th retention frame, and I<j. The driving method includes: a voltage of the first bias adjustment signal in the i-th retention frame is controlled to be V12*i*, a voltage of the first bias adjustment signal in the j-th retention frame is controlled to be V12*j*, and |V12*i*|<|V12*j*|; and/or a voltage of the second bias adjustment signal in the i-th retention frame is controlled to be V22*i*, a voltage of the second bias adjustment signal in the j-th retention frame is controlled to be V22*j*, and |V22*i*|<|V22*j*|.

In some embodiments, the amplitude modulation subcircuit includes a first drive transistor, the pulse width modulation subcircuit includes a second drive transistor, the bias adjustment signal includes a first bias adjustment signal and a second bias adjustment signal, the first bias adjustment signal is configured to adjust the bias state of the first drive transistor, and the second bias adjustment signal is configured to adjust the bias state of the second drive transistor. A working cycle of the pixel circuit includes at least one bias stage. The driving method includes: a voltage of the first bias adjustment signal in an m-th working cycle is controlled to be V1*m*, a voltage of the first bias adjustment signal in an n-th working cycle is controlled to be V1*n*, and V1*m*=V1*n*; and/or a voltage of the second bias adjustment signal in an m-th working cycle is controlled to be V2*m*, a voltage of the second bias adjustment signal in an n-th working cycle is controlled to be V2*n*, and V2*m*=V2*n*.

In some embodiments, the amplitude modulation subcircuit includes a first drive transistor, the pulse width modulation subcircuit includes a second drive transistor, the bias adjustment signal includes a first bias adjustment signal and a second bias adjustment signal, the first bias adjustment signal is configured to adjust the bias state of the first drive transistor, and the second bias adjustment signal is configured to adjust the bias state of the second drive transistor. A working cycle of the pixel circuit includes at least one bias stage. The driving method includes: a voltage of the first bias adjustment signal in an x-th working cycle is controlled to be V1*x*, a voltage of the first bias adjustment signal in a y-th working cycle is controlled to be V1*y*, and V1*x*≠V1*y*; and/or a voltage of the second bias adjustment signal in an x-th working cycle is controlled to be V2*x*, a voltage of the second bias adjustment signal in a y-th working cycle is controlled to be V2*y*, and V2*x*≠V2*y*.

In some embodiments, the driving method includes: the number of bias stages of the amplitude modulation subcircuit within a target time period is controlled to be a1, the number of bias stages of the pulse width modulation subcircuit within the target time period is controlled to be b1, and a1<b1.

In some embodiments, the amplitude modulation subcircuit includes a first drive transistor, the pulse width modulation subcircuit includes a second drive transistor, the bias adjustment signal includes a first bias adjustment signal and a second bias adjustment signal, the first bias adjustment signal is configured to adjust the bias state of the first drive transistor, and the second bias adjustment signal is configured to adjust the bias state of the second drive transistor. The display panel includes a first brightness mode and a second brightness mode. The driving method includes: a voltage of the first bias adjustment signal in the first brightness mode is controlled to be $V1_{L1}$, a voltage of the first bias adjustment signal in the second brightness mode is controlled to be $V1_{L2}$, and $V1_{L1} \neq V1_{L2}$; and/or a voltage of the second bias adjustment signal in the first brightness mode is controlled to be $V2_{L1}$, a voltage of the second bias adjustment signal in the second brightness mode is controlled to be $V2_{L2}$, and $V2_{L1} \neq V2_{L2}$.

In some embodiments, the brightness of the display panel in the first brightness mode is less than the brightness of the display panel in the second brightness mode; $|V1_{L1}|<|V1_{L2}|$ and/or $|V2_{L1}|>|V2_{L2}|$.

In some embodiments, the amplitude modulation subcircuit includes a first drive transistor, the pulse width modulation subcircuit includes a second drive transistor, the bias adjustment signal includes a first bias adjustment signal and a second bias adjustment signal, the first bias adjustment signal is configured to adjust the bias state of the first drive transistor, and the second bias adjustment signal is configured to adjust the bias state of the second drive transistor. The display panel includes a first refresh frequency and a second refresh frequency. The driving method includes: a voltage of the first bias adjustment signal at the first refresh frequency is controlled to be $V1_{F1}$, a voltage of the first bias adjustment signal at the second refresh frequency is controlled to be $V1_{F2}$, and $V1_{F1} \neq V1_{F2}$; and/or a voltage of the second bias adjustment signal at the first refresh frequency is controlled to be $V2_{F2}$, a voltage of the second bias adjustment signal at the second refresh frequency is controlled to be $V2_{F2}$, and $V2_{F1} \neq V2_{F2}$.

In some embodiments, the first refresh frequency is greater than the second refresh frequency; $|V1_{F1}|<|V1_2|$ and/or $|V2_{F1}|<|V2_2|$.

In some embodiments, the amplitude modulation subcircuit includes a first drive transistor, the pulse width modulation subcircuit includes a second drive transistor, the bias adjustment signal includes a first bias adjustment signal and a second bias adjustment signal, the first bias adjustment signal is configured to adjust the bias state of the first drive transistor, and the second bias adjustment signal is configured to adjust the bias state of the second drive transistor. The pixel circuit includes a first pixel circuit and a second pixel circuit, the light-emitting element includes a first light-emitting element and a second light-emitting element, the first pixel circuit is configured to drive the first light-emitting element, the second pixel circuit is configured to drive the second light-emitting element, and the light-emitting color of the first light-emitting element is different from the light-emitting color of the second light-emitting element. The driving method includes: a voltage value of the first bias adjustment signal received by the first pixel circuit is controlled to be V13, a voltage value of the second bias adjustment signal received by the first pixel circuit is controlled to be V23, a voltage value of the first bias adjustment signal received by the second pixel circuit is controlled to be V14, and a voltage value of the second bias adjustment signal received by the second pixel circuit is controlled to be V24; and $V13 \neq V14$, and/or $V23 \neq V24$.

In some embodiments, the first light-emitting element includes a red light-emitting element, and the second light-emitting element includes at least one of a green light-emitting element or a blue light-emitting element; and $|V13|>|V14|$, and/or $|V23|>|V24|$.

Figure 19:
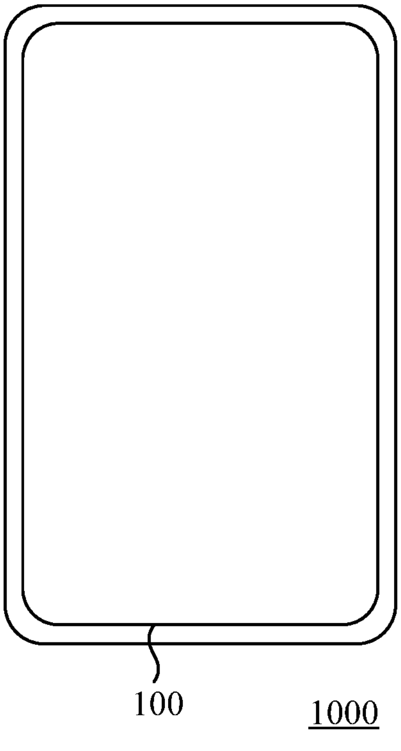
FIG. 19 shows a schematic structural diagram of a display device according to an embodiment of the present disclosure.

The present disclosure further provides a display device, including the display panel provided in the present disclosure. Referring to FIG. 19, FIG. 19 is a schematic structural diagram of a display device according to an embodiment of the present disclosure. The display device 1000 provided in FIG. 19 includes the display panel 100 provided in any one of the foregoing embodiments of the present disclosure. In this embodiment, only a mobile phone is used as an example to describe the display device 1000. It should be understood that the display device provided in the embodiments of the present disclosure may be other display devices that have the display function, such as a wearable product, a computer, a television, or an in-vehicle display device, which is not specifically limited in the present disclosure. The display device provided in the embodiments of the present disclosure has a beneficial effect of the display panel provided in the embodiments of the present disclosure. For details, reference can be made to the specific description of the above embodiments for the display panel. Details are not described herein again in this embodiment.

In accordance with the embodiments of the present disclosure as set forth above, these embodiments are not intended to be exhaustive or to limit the present disclosure to the embodiments described. Apparently, many modifications and variations are possible in light of the above description. These embodiments were chosen and described in the Specification in order to best explain the principles and the practical application of the present disclosure. Thus, those skilled in the art would have been able to make full use of the present disclosure and make various modifications and uses based on the present disclosure. The present disclosure is limited only by the claims and their full scope and equivalents.

What is claimed is:

1. A display panel, comprising a pixel circuit and a light-emitting element;

wherein the pixel circuit comprises an amplitude modulation subcircuit and a pulse width modulation subcircuit, and the amplitude modulation subcircuit and the pulse width modulation subcircuit each comprises a drive transistor;

wherein a working process of at least one of the amplitude modulation subcircuit or the pulse width modulation subcircuit comprises a bias stage, a bias adjustment signal is provided to the drive transistor during the bias stage, and the bias adjustment signal is configured to adjust a bias state of the drive transistor;

wherein the amplitude modulation subcircuit comprises a first drive transistor, the pulse width modulation subcircuit comprises a second drive transistor, the bias adjustment signal comprises a first bias adjustment signal and a second bias adjustment signal, the first bias adjustment signal is configured to adjust a bias state of the first drive transistor, and the second bias adjustment signal is configured to adjust a bias state of the second drive transistor;

wherein a working cycle of the pixel circuit comprises at least one bias stage; and wherein a voltage of the first bias adjustment signal in an m-th working cycle is $V1m$, a voltage of the first bias adjustment signal in an n-th working cycle is $V1n$, and $V1m=V1n$;

and/or a voltage of the second bias adjustment signal in an m-th working cycle is $V2m$, a voltage of the second bias adjustment signal in an n-th working cycle is $V2n$, and $V2m=V2n$.

2. The display panel of claim 1, wherein the working process of the amplitude modulation subcircuit comprises a first data write stage and a first bias stage; and wherein the amplitude modulation subcircuit comprises a first data write module, and the first data write module is configured to write a first data signal during the first data write stage and write the first bias adjustment signal during the first bias stage; or the amplitude modulation subcircuit comprises a first data write module and a first bias module, the first data write module is configured to write a first data signal during the first data write stage, and the first bias module is configured to write the first bias adjustment signal during the first bias stage; or the working process of the amplitude modulation subcircuit further comprises a first reset stage, the amplitude modulation subcircuit comprises a first reset module, and the first reset module is configured to write a first reset signal during the first reset stage and write the first bias adjustment signal during the first bias stage.

3. The display panel of claim 1, wherein the working process of the pulse width modulation subcircuit comprises a second data write stage and a second bias stage; and wherein the pulse width modulation subcircuit comprises a second data write module, and the second data write module is configured to write a second data signal during the second data write stage and write the second bias adjustment signal during the second bias stage; or the pulse width modulation subcircuit comprises a second data write module and a second bias module, the second data write module is configured to write a second data signal during the second data write stage, and the second bias module is configured to write the second bias adjustment signal during the second bias stage; or the working process of the pulse width modulation subcircuit further comprises a second reset stage, the pulse width modulation subcircuit comprises a second reset module, and the second reset module is configured to write a second reset signal during the second reset stage and write the second bias adjustment signal during the second bias stage.

4. The display panel of claim 1, wherein a voltage of the first bias adjustment signal is V1, a voltage of the second bias adjustment signal is V2, and V1≠V2.

5. The display panel of claim 1, wherein a number of bias stages of the amplitude modulation subcircuit within a target time period is a1, a number of bias stages of the pulse width modulation subcircuit within the target time period is b1, and a1<b1.

6. The display panel of claim 1, wherein the display panel comprises a first refresh frequency and a second refresh frequency; and wherein a voltage of the first bias adjustment signal at the first refresh frequency is $V1_{F1}$, a voltage of the first bias adjustment signal at the second refresh frequency is $V1_{F2}$, and $V1_{F1} \neq V1_{F2}$; and/or a voltage of the second bias adjustment signal at the first refresh frequency is $V2_{F1}$, a voltage of the second bias adjustment signal at the second refresh frequency is $V2_{F2}$, and $V2_{F1} \neq V2_{F2}$.

7. The display panel of claim 6, wherein the first refresh frequency is greater than the second refresh frequency; and wherein $|V1_{F1}|<|V1_{F2}|$ and/or $|V2_{F1}|<|V2_{F2}|$.

8. The display panel of claim 1, wherein the pixel circuit comprises a first pixel circuit and a second pixel circuit, the light-emitting element comprises a first light-emitting element and a second light-emitting element, the first pixel circuit is configured to drive the first light-emitting element, the second pixel circuit is configured to drive the second light-emitting element, and a light-emitting color of the first light-emitting element is different from a light-emitting color of the second light-emitting element;

a voltage value of the first bias adjustment signal received by the first pixel circuit is V13, a voltage value of the second bias adjustment signal received by the first pixel circuit is V23, a voltage value of the first bias adjustment signal received by the second pixel circuit is V14, and a voltage value of the second bias adjustment signal received by the second pixel circuit is V24; and wherein V13≠V14 and/or V23≠V24.

9. The display panel of claim 8, wherein the first light-emitting element comprises a red light-emitting element, and the second light-emitting element comprises at least one of a green light-emitting element or a blue light-emitting element; and wherein |V13|>|V14| and/or |V23|>|V24|.

10. A display device, comprising the display panel of claim 1.

11. A driving method of the display panel of claim 1, comprising:

providing the drive transistor with the bias adjustment signal during the bias stage.

12. A display panel, comprising a pixel circuit and a light-emitting element;

wherein the pixel circuit comprises an amplitude modulation subcircuit and a pulse width modulation subcircuit, and the amplitude modulation subcircuit and the pulse width modulation subcircuit each comprises a drive transistor;

wherein a working process of at least one of the amplitude modulation subcircuit or the pulse width modulation subcircuit comprises a bias stage, a bias adjustment signal is provided to the drive transistor during the bias stage, and the bias adjustment signal is configured to adjust a bias state of the drive transistor;

wherein the amplitude modulation subcircuit comprises a first drive transistor, the pulse width modulation subcircuit comprises a second drive transistor, the bias adjustment signal comprises a first bias adjustment signal and a second bias adjustment signal, the first bias adjustment signal is configured to adjust a bias state of the first drive transistor, and the second bias adjustment signal is configured to adjust a bias state of the second drive transistor;

wherein a working cycle of the pixel circuit comprises at least one data write frame and at least one retention frame, and the at least one data write frame and the at least one retention frame each comprises at least one bias stage; and wherein a voltage of the first bias adjustment signal during the at least one data write frame is V11, a voltage of the first bias adjustment signal during the at least one retention frame is V12, and V11≠V12; and/or a voltage of the second bias adjustment signal during the at least one data write frame is V21, a voltage of the second bias adjustment signal during the at least one retention frame is V22, and V21≠V22.

13. The display panel of claim 12, wherein |V11|<|V12| and/or |V21|<|V22|.

14. The display panel of claim 12, wherein the working cycle of the pixel circuit comprises a plurality of retention frames, and at least two retention frames among the plurality of retention frames each comprises the at least one bias stage; and wherein V12 is unchanged in different retention frames of a same working cycle; and/or V22 is unchanged in different retention frames of a same working cycle.

15. The display panel of claim 12, wherein the working cycle of the pixel circuit comprises a plurality of retention frames, and at least two retention frames among the plurality of retention frames each comprises the at least one bias stage; and wherein V12 is different in different retention frames of a same working cycle; and/or V22 is different in different retention frames of a same working cycle.

16. The display panel of claim 15, wherein a same working cycle comprises an i-th retention frame and a j-th retention frame, and i<j; and wherein a voltage of the first bias adjustment signal during the i-th retention frame is V12*i*, a voltage of the first bias adjustment signal during the j-th retention frame is V12*j*, and |V12*i*|<|V12*j*|; and/or a voltage of the second bias adjustment signal during the i-th retention frame is V22*i*, a voltage of the second bias adjustment signal during the j-th retention frame is V22*j*, and |V22*i*|<|V22*j*|.

17. A display device, comprising the display panel of claim 12.

18. A display panel, comprising a pixel circuit and a light-emitting element;

wherein the pixel circuit comprises an amplitude modulation subcircuit and a pulse width modulation subcircuit, and the amplitude modulation subcircuit and the pulse width modulation subcircuit each comprises a drive transistor;

wherein a working process of at least one of the amplitude modulation subcircuit or the pulse width modulation subcircuit comprises a bias stage, a bias adjustment signal is provided to the drive transistor during the bias stage, and the bias adjustment signal is configured to adjust a bias state of the drive transistor;

wherein the amplitude modulation subcircuit comprises a first drive transistor, the pulse width modulation subcircuit comprises a second drive transistor, the bias adjustment signal comprises a first bias adjustment signal and a second bias adjustment signal, the first bias adjustment signal is configured to adjust a bias state of the first drive transistor, and the second bias adjustment signal is configured to adjust a bias state of the second drive transistor;

wherein the display panel comprises a first brightness mode and a second brightness mode; and wherein a voltage of the first bias adjustment signal in the first brightness mode is $V\mathbf{1}_{L1}$, a voltage of the first bias adjustment signal in the second brightness mode is $V\mathbf{1}_{L2}$, and $V\mathbf{1}_{L1} \neq V\mathbf{1}_{L2}$; and/or a voltage of the second bias adjustment signal in the first brightness mode is $V\mathbf{2}_{L1}$, a voltage of the second bias adjustment signal in the second brightness mode is $V\mathbf{2}_{L2}$, and $V\mathbf{2}_{L1} \neq V\mathbf{2}_{L2}$.

19. The display panel of claim 18, wherein a brightness of the display panel in the first brightness mode is less than a brightness of the display panel in the second brightness mode; and wherein $|V\mathbf{1}_{L1}| < |V\mathbf{1}_{L2}|$ and/or $|V\mathbf{2}_{L1}| > |V\mathbf{2}_{L2}|$.

20. A display device, comprising the display panel of claim 18.

* * * * *